(12) United States Patent
Fischer et al.

(10) Patent No.: US 9,195,988 B2
(45) Date of Patent: Nov. 24, 2015

(54) SYSTEMS AND METHODS FOR AN ANALYSIS CYCLE TO DETERMINE INTEREST MERCHANTS

(71) Applicant: American Express Travel Related Services Company, Inc., New York, NY (US)

(72) Inventors: Terrence Fischer, New York, NY (US); Anthony Harry Mavromatis, Brooklyn, NY (US); Monique M. Navarro, New York, NY (US); Benjamin Schulte, Brooklyn, NY (US); Venkat Varadachary, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 108 days.

(21) Appl. No.: 13/715,792

(22) Filed: Dec. 14, 2012

(65) Prior Publication Data
US 2013/0246124 A1 Sep. 19, 2013

Related U.S. Application Data

(60) Provisional application No. 61/610,461, filed on Mar. 13, 2012, provisional application No. 61/646,778, filed on May 14, 2012, provisional application No. 61/700,850, filed on Sep. 13, 2012.

(51) Int. Cl.
*G06Q 30/02* (2012.01)

(52) U.S. Cl.
CPC ........ *G06Q 30/0201* (2013.01); *G06Q 30/0204* (2013.01); *G06Q 30/0255* (2013.01)

(58) Field of Classification Search
CPC ................................................. G06Q 30/0204
USPC ....................................................... 705/7.33
See application file for complete search history.

(56) References Cited

U.S. PATENT DOCUMENTS

| 4,833,308 A | 5/1989 | Humble |
| 4,882,675 A | 11/1989 | Nichtberger et al. |

(Continued)

FOREIGN PATENT DOCUMENTS

| WO | 0186378 | 11/2001 |
| WO | 2012024109 | 2/2012 |

(Continued)

OTHER PUBLICATIONS

USPTO; Advisory Action dated Sep. 3, 2014 in U.S. Appl. No. 13/466,412.

(Continued)

*Primary Examiner* — Jonathan G Sterrett
*Assistant Examiner* — Hafiz Kassim
(74) *Attorney, Agent, or Firm* — Snell & Wilmer L.L.P.

(57) ABSTRACT

The method of processing an analysis cycle to determine interest merchants may include selecting a seed merchant relevant to a topic interest, identifying consumers that have completed a transaction with the seed merchant to generate a list of identified consumers, determining merchants visited by the identified consumers, scoring all the merchants based on network connectivity, activity, and merchant over-index, updating the seed merchant in response to the list of scored merchants relative to a scoring threshold, and scoring the list of identified consumers based on the number of distinct merchants in transaction and over-indexing. Additionally, the method may further comprise producing a list of updated interest merchants and a list of updated identified consumers, where the updated interest merchants and the updated identified consumers are relevant to the topic interest.

19 Claims, 21 Drawing Sheets

(56) References Cited

U.S. PATENT DOCUMENTS

| | | |
|---|---|---|
| 5,025,372 A | 6/1991 | Burton et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | DeLorme et al. |
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,222,914 B1 | 4/2001 | McMullin |
| 6,266,649 B1 | 7/2001 | Linden et al. |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,882,290 B2 | 4/2005 | French et al. |
| 6,883,708 B1 | 4/2005 | Fiedler et al. |
| 6,904,408 B1 | 6/2005 | McCarthy et al. |
| 6,937,995 B1 | 8/2005 | Kepecs |
| 7,003,476 B1 | 2/2006 | Samra et al. |
| 7,010,497 B1 | 3/2006 | Nyhan et al. |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 | 10/2006 | Solomon et al. |
| 7,139,793 B2 | 11/2006 | Lala et al. |
| 7,146,328 B1 | 12/2006 | Solomon et al. |
| 7,165,037 B2 | 1/2007 | Lazarus et al. |
| 7,302,429 B1 * | 11/2007 | Wanker .................. G06Q 30/02 |
| 7,392,224 B1 | 6/2008 | Bauer et al. |
| 7,428,505 B1 | 9/2008 | Levy et al. |
| 7,430,521 B2 | 9/2008 | Walker et al. |
| 7,472,073 B1 | 12/2008 | Masi |
| 7,493,268 B2 | 2/2009 | Kepros et al. |
| 7,496,520 B1 | 2/2009 | Handel et al. |
| 7,499,889 B2 | 3/2009 | Golan et al. |
| 7,506,805 B1 | 3/2009 | Chakravarthy |
| 7,596,566 B1 | 9/2009 | Patwardhan |
| 7,599,858 B1 | 10/2009 | Grady et al. |
| 7,618,318 B2 | 11/2009 | Ciancio et al. |
| 7,630,935 B2 | 12/2009 | Loeger et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B1 | 6/2010 | Handel et al. |
| 7,743,002 B2 | 6/2010 | Hernandez |
| 7,747,524 B2 | 6/2010 | Brown |
| 7,752,328 B2 | 7/2010 | Mortimore, Jr. et al. |
| 7,765,119 B2 | 7/2010 | Messa et al. |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 | 11/2010 | Merriman et al. |
| 7,865,513 B2 | 1/2011 | Welch et al. |
| 7,870,022 B2 | 1/2011 | Bous et al. |
| 7,899,704 B1 | 3/2011 | Thompson |
| 7,925,540 B1 | 4/2011 | Orttung et al. |
| 7,933,810 B2 | 4/2011 | Morgentstern |
| 7,937,330 B2 | 5/2011 | Handel et al. |
| 7,941,374 B2 | 5/2011 | Orttung et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,073,719 B2 | 12/2011 | Orttung et al. |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |
| 8,121,953 B1 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,249,934 B2 | 8/2012 | Agarwal et al. |
| 8,438,061 B2 | 5/2013 | Grimes |
| 8,459,551 B2 | 6/2013 | Lee et al. |
| 8,463,643 B2 | 6/2013 | Bennett |
| 8,463,706 B2 | 6/2013 | Cervenka et al. |
| 8,463,851 B2 | 6/2013 | Bennett et al. |
| 8,468,053 B2 | 6/2013 | Bennett |
| 8,473,334 B2 | 6/2013 | Gibbs |
| 8,484,088 B1 | 7/2013 | Orttung et al. |
| 8,484,093 B2 | 7/2013 | Bennett et al. |
| 8,489,456 B2 | 7/2013 | Burgess et al. |
| 8,494,901 B2 | 7/2013 | Magadi et al. |
| 8,494,914 B2 | 7/2013 | Mesaros |
| 8,504,423 B2 | 8/2013 | Rotbard et al. |
| 8,515,810 B2 | 8/2013 | Grimes |
| 8,517,258 B2 | 8/2013 | Taylor et al. |
| 8,543,470 B2 | 9/2013 | Grady et al. |
| 8,560,389 B2 | 10/2013 | Burgess et al. |
| 8,573,477 B2 | 11/2013 | Bennett et al. |
| 8,573,491 B2 | 11/2013 | Bennett et al. |
| 8,606,630 B2 | 12/2013 | Fordyce, III et al. |
| 8,615,426 B2 | 12/2013 | Carlson |
| 8,621,068 B2 | 12/2013 | Zohar et al. |
| 8,626,579 B2 | 1/2014 | Fordyce, III et al. |
| 8,639,567 B2 | 1/2014 | Winters |
| 8,650,071 B2 | 2/2014 | Pointer et al. |
| 2001/0014868 A1 | 8/2001 | Herz et al. |
| 2001/0020242 A1 | 9/2001 | Gupta et al. |
| 2001/0037254 A1 | 11/2001 | Glikman |
| 2001/0054003 A1 | 12/2001 | Chien et al. |
| 2002/0069079 A1 | 6/2002 | Vega |
| 2002/0082920 A1 | 6/2002 | Austin et al. |
| 2002/0095357 A1 | 7/2002 | Hunter et al. |
| 2002/0138343 A1 | 9/2002 | Weatherford et al. |
| 2002/0178056 A1 | 11/2002 | Lim |
| 2003/0004802 A1 | 1/2003 | Callegari |
| 2003/0027630 A1 | 2/2003 | Kelly et al. |
| 2003/0028518 A1 | 2/2003 | Mankoff |
| 2003/0033211 A1 | 2/2003 | Haines et al. |
| 2003/0061093 A1 | 3/2003 | Todd |
| 2003/0078832 A1 | 4/2003 | Alvarez et al. |
| 2003/0208442 A1 | 11/2003 | Cockrill et al. |
| 2003/0233278 A1 | 12/2003 | Marshall |
| 2004/0006509 A1 | 1/2004 | Mannik et al. |
| 2004/0122736 A1 | 6/2004 | Strock et al. |
| 2004/0153389 A1 | 8/2004 | Lortscher |
| 2004/0225573 A1 | 11/2004 | Ling |
| 2004/0243468 A1 | 12/2004 | Cohagan et al. |
| 2005/0010472 A1 | 1/2005 | Quatse et al. |

(56) References Cited

U.S. PATENT DOCUMENTS

| | | |
|---|---|---|
| 2005/0021401 A1 | 1/2005 | Postrel |
| 2005/0065848 A1 | 3/2005 | Mitchell et al. |
| 2005/0071225 A1 | 3/2005 | Bortolin et al. |
| 2005/0071227 A1 | 3/2005 | Hammad et al. |
| 2005/0071228 A1 | 3/2005 | Bortolin et al. |
| 2005/0071230 A1 | 3/2005 | Mankoff |
| 2005/0096976 A1 | 5/2005 | Nelms |
| 2005/0149394 A1 | 7/2005 | Postrel |
| 2005/0159996 A1 | 7/2005 | Lazarus |
| 2005/0192863 A1 | 9/2005 | Mohan |
| 2005/0240477 A1 | 10/2005 | Friday et al. |
| 2005/0246272 A1 | 11/2005 | Kitada et al. |
| 2005/0273388 A1 | 12/2005 | Roetter |
| 2006/0004633 A1 | 1/2006 | Ashbaugh |
| 2006/0026067 A1 | 2/2006 | Nicholas et al. |
| 2006/0041480 A1 | 2/2006 | Briggs |
| 2006/0053056 A1 | 3/2006 | Alspach-Goss et al. |
| 2006/0064372 A1 | 3/2006 | Gupta |
| 2006/0074749 A1 | 4/2006 | Kline |
| 2006/0076400 A1 | 4/2006 | Fletcher |
| 2006/0085240 A1 | 4/2006 | Salehi-sedeh et al. |
| 2006/0095434 A1 | 5/2006 | McCullough et al. |
| 2006/0111930 A1 | 5/2006 | Ayer et al. |
| 2006/0116800 A1 | 6/2006 | Obradovich et al. |
| 2006/0129426 A1 | 6/2006 | Pearson |
| 2006/0136299 A1 | 6/2006 | Ruhmkorf |
| 2006/0155603 A1 | 7/2006 | Abendroth et al. |
| 2006/0155641 A1 | 7/2006 | Postrel |
| 2006/0178932 A1 | 8/2006 | Lang |
| 2006/0195359 A1 | 8/2006 | Robinson et al. |
| 2006/0224449 A1 | 10/2006 | Byerley et al. |
| 2006/0241859 A1 | 10/2006 | Kimchi et al. |
| 2006/0242011 A1 | 10/2006 | Bell et al. |
| 2006/0253321 A1 | 11/2006 | Heywood |
| 2006/0258397 A1 | 11/2006 | Kaplan et al. |
| 2006/0259364 A1 | 11/2006 | Strock et al. |
| 2006/0271552 A1 | 11/2006 | McChesney et al. |
| 2007/0000997 A1 | 1/2007 | Lambert et al. |
| 2007/0010942 A1 | 1/2007 | Bill |
| 2007/0022019 A1 | 1/2007 | Sherwin et al. |
| 2007/0033104 A1 | 2/2007 | Collins et al. |
| 2007/0038515 A1 | 2/2007 | Postrel |
| 2007/0038516 A1 | 2/2007 | Apple et al. |
| 2007/0050258 A1 | 3/2007 | Dohse |
| 2007/0061223 A1 | 3/2007 | Rodriguez et al. |
| 2007/0073599 A1 | 3/2007 | Perry et al. |
| 2007/0083428 A1 | 4/2007 | Goldstein |
| 2007/0094114 A1 | 4/2007 | Bufford et al. |
| 2007/0129995 A1 | 6/2007 | Brandow |
| 2007/0130000 A1 | 6/2007 | Assanassios |
| 2007/0136135 A1 | 6/2007 | Loeger et al. |
| 2007/0146812 A1 | 6/2007 | Lawton |
| 2007/0150349 A1 | 6/2007 | Handel et al. |
| 2007/0192178 A1 | 8/2007 | Fung et al. |
| 2007/0192192 A1 | 8/2007 | Haberman et al. |
| 2007/0198354 A1 | 8/2007 | Senghore et al. |
| 2007/0198432 A1 | 8/2007 | Pitroda et al. |
| 2007/0208879 A1 | 9/2007 | Liu |
| 2007/0210152 A1 | 9/2007 | Read |
| 2007/0214040 A1 | 9/2007 | Patel et al. |
| 2007/0244741 A1 | 10/2007 | Blume et al. |
| 2007/0244811 A1 | 10/2007 | Tumminaro |
| 2007/0260513 A1 | 11/2007 | Pavlov |
| 2007/0288312 A1 | 12/2007 | Wang |
| 2007/0288372 A1 | 12/2007 | Behar et al. |
| 2008/0004917 A1 | 1/2008 | Mortimore, Jr. |
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0032720 A1 | 2/2008 | Mamdani et al. |
| 2008/0040211 A1 | 2/2008 | Walker et al. |
| 2008/0040288 A1 | 2/2008 | Mortimore, Jr. et al. |
| 2008/0052140 A1 | 2/2008 | Neal et al. |
| 2008/0052151 A1 | 2/2008 | Xie et al. |
| 2008/0065491 A1 | 3/2008 | Bakman |
| 2008/0082418 A1 | 4/2008 | Fordyce et al. |
| 2008/0091445 A1 | 4/2008 | Mihic |
| 2008/0091528 A1 | 4/2008 | Rampell et al. |
| 2008/0091537 A1 | 4/2008 | Miller et al. |
| 2008/0091549 A1 | 4/2008 | Chang et al. |
| 2008/0091828 A1 | 4/2008 | Mortimore, Jr. |
| 2008/0092162 A1 | 4/2008 | Lundy et al. |
| 2008/0120155 A1 | 5/2008 | Pliha |
| 2008/0126515 A1 | 5/2008 | Chambers et al. |
| 2008/0147450 A1 | 6/2008 | Mortimore, Jr. |
| 2008/0147514 A1 | 6/2008 | Shuster et al. |
| 2008/0162206 A1 | 7/2008 | Mak et al. |
| 2008/0189169 A1 | 8/2008 | Turpin et al. |
| 2008/0195475 A1 | 8/2008 | Lambert et al. |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0255940 A1 | 10/2008 | Perreault et al. |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1* | 1/2009 | Fusillo ............... G06Q 30/0204 705/7.33 |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1 | 3/2009 | Schmeyer et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0182718 A1 | 7/2009 | Waclawik et al. |
| 2009/0210261 A1 | 8/2009 | Mortimore, Jr. et al. |
| 2009/0228365 A1 | 9/2009 | Tomchek et al. |
| 2009/0247193 A1 | 10/2009 | Kalavade |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327174 A1 | 12/2009 | Honkala |
| 2010/0057565 A1 | 3/2010 | Au-Yeung et al. |
| 2010/0082418 A1 | 4/2010 | Loeger et al. |
| 2010/0088174 A1 | 4/2010 | Cohagan et al. |
| 2010/0094697 A1 | 4/2010 | Cavanaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |

(56) References Cited

U.S. PATENT DOCUMENTS

| | | |
|---|---|---|
| 2010/0145786 A1 | 6/2010 | Fordyce, III et al. |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125565 A1 | 5/2011 | MacIlwaine et al. |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161154 A1 | 6/2011 | McLaughlin et al. |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0218031 A1 | 9/2011 | Bryant et al. |
| 2011/0225033 A1 | 9/2011 | Schmeyer et al. |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0264490 A1 | 10/2011 | Durvasula et al. |
| 2011/0270666 A1 | 11/2011 | Welsh et al. |
| 2011/0276373 A1 | 11/2011 | Juszczak et al. |
| 2011/0276377 A1* | 11/2011 | Kim ................ G06Q 30/02 705/14.17 |
| 2011/0282702 A1 | 11/2011 | Mortimore, Jr. |
| 2011/0288918 A1 | 11/2011 | Cervenka et al. |
| 2011/0295689 A1 | 12/2011 | Brady |
| 2011/0295749 A1 | 12/2011 | Scalisi |
| 2011/0302011 A1 | 12/2011 | Yoder et al. |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029996 A1 | 2/2012 | Lang et al. |
| 2012/0030048 A1 | 2/2012 | Manley et al. |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0046958 A1 | 2/2012 | Pynadath |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0150740 A1 | 6/2012 | Isaacson et al. |
| 2012/0203604 A1 | 8/2012 | Baker et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |
| 2012/0226530 A1 | 9/2012 | Gebb et al. |
| 2012/0239479 A1 | 9/2012 | Amaro et al. |
| 2012/0278127 A1 | 11/2012 | Kirakosyan et al. |
| 2012/0296724 A1 | 11/2012 | Faro et al. |
| 2012/0303425 A1* | 11/2012 | Katzin ................ G06Q 20/027 705/14.4 |
| 2012/0303430 A1 | 11/2012 | Tiku et al. |
| 2013/0013396 A1 | 1/2013 | Vinson et al. |
| 2013/0024256 A1 | 1/2013 | Wolf et al. |
| 2013/0041902 A1 | 2/2013 | Swann et al. |
| 2013/0060623 A1 | 3/2013 | Walker et al. |
| 2013/0073361 A1 | 3/2013 | Silver |
| 2013/0073371 A1 | 3/2013 | Bosworth et al. |
| 2013/0073568 A1 | 3/2013 | Federov et al. |
| 2013/0091000 A1 | 4/2013 | Hagey et al. |
| 2013/0103472 A1 | 4/2013 | Burgess et al. |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross et al. |
| 2013/0191195 A1 | 7/2013 | Carlson et al. |
| 2013/0218653 A1 | 8/2013 | Rooke et al. |
| 2013/0238412 A1 | 9/2013 | Boncyk et al. |
| 2013/0246146 A1 | 9/2013 | Fischer et al. |
| 2013/0262209 A1 | 10/2013 | Boyer |
| 2013/0268333 A1 | 10/2013 | Ovick et al. |
| 2013/0275192 A1 | 10/2013 | Aissa |
| 2013/0304563 A1 | 11/2013 | Haupt et al. |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |

(56) References Cited

U.S. PATENT DOCUMENTS

2014/0025460 A1     1/2014   Knowles et al.
2014/0046744 A1     2/2014   Hagey

FOREIGN PATENT DOCUMENTS

| WO | 2012106114 | 8/2012 |
| WO | 2012170088 | 12/2012 |
| WO | 2013015846 | 1/2013 |

OTHER PUBLICATIONS

USPTO; Office Action dated Oct. 17, 2014 in U.S. Appl. No. 14/065,883.
USPTO; Office Action dated Jul. 30, 2014 in U.S. Appl. No. 13/794,301.
USPTO; Advisory Action dated Sep. 3, 2014 in U.S. Appl. No. 13/467,503.
USPTO; Advisory Action dated Jul. 30, 2014 in U.S. Appl. No. 13/411,281.
Examination Report dated Aug. 11, 2014 in New Zealand Application No. 623019.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/021,237.
USPTO; Office Action dated Oct. 17, 2014 in U.S. Appl. No. 11/779,734.
USPTO; Advisory Action dated Sep. 3, 2014 in U.S. Appl. No. 12/857,389.
USPTO; Advisory Action dated Jul. 30, 2014 in U.S. Appl. No. 13/593,204.
USPTO; Office Action dated Oct. 20, 2014 in U.S. Appl. No. 13/941,306.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 3, 2014 in U.S. Appl. No. 12/857,424.
USPTO; Advisory Action dated Sep. 2, 2014 in U.S. Appl. No. 13/466,445.
USPTO; Office Action dated Oct. 9, 2014 in U.S. Appl. No. 13/926,789.
USPTO; Advisory Action dated Jul. 31, 2014 in U.S. Appl. No. 13/476,910.
USPTO; Advisory Action dated Aug. 7, 2014 in U.S. Appl. No. 13/468,931.
USPTO; Office Action dated Oct. 8, 2014 in U.S. Appl. No. 13/734,693.
USPTO; Advisory Action dated Sep. 5, 2014 in U.S. Appl. No. 13/889,305.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.
USPTO; Final Office Action dated Jan. 29, 2014 in U.S. Appl. No. 13/889,307.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated on Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/m1b-ibeacon-rollout/ on Feb. 12, 2014.
D Arthur, S Vassilvitskii , "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pp. 1-4, page last modified on Nov. 18, 2013, http://en.wikipedia.org/wiki/K-means++ retrieved from the web Nov. 21, 2013.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Advisory Action dated Apr. 30, 2014 in U.S. Appl. No. 13/715,423.
USPTO; Final Office Action dated May 5, 2014 in U.S. Appl. No. 13/411,281.
International Search Report and Written Opinion dated Dec. 7, 2012 in Application No. PCT/2012/056231.
International Preliminary Report on Patentability dated on Aug. 22, 2013 in Application No. PCT/US2012/056231.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Final Office Action dated Jan. 4, 2013 in U.S. Appl. No. 13/593,204.

(56) References Cited

OTHER PUBLICATIONS

USPTO; Final Office Action dated Jan. 7, 2013 in U.S. Appl. No. 13/467,503.
USPTO; Final Office Action dated Jan. 7, 2013 in U.S. Appl. No. 13/466,445.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
USPTO; Final Office Action dated May 2, 2013 in U.S. Appl. No. 13/468,880.
International Preliminary Report on Patentability dated on May 7, 2013 in Application No. PCT/US2012/021648.
USPTO; Advisory Action dated May 10, 2013 in U.S. Appl. No. 13/477,806.
USPTO; Advisory Action dated May 22, 2013 in U.S. Appl. No. 13/188,693.
USPTO; Office Action dated May 7, 2014 in U.S. Appl. No. 13/477,806.
USPTO; Final Office Action dated May 13, 2014 in U.S. Appl. No. 13/476,910.
USPTO; Final Office Action dated May 20, 2014 in U.S. Appl. No. 13/593,204.
USPTO; Notice of Allowance dated May 22, 2014 in U.S. Appl. No. 13/245,636.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
USPTO; Advisory Action dated Jul. 8, 2014 in U.S. Appl. No. 13/889,299.
USPTO; Office Action dated May 23, 2013 in U.S. Appl. No. 13/734,693.
International Preliminary Report on Patentability dated on May 23, 2013 in Application No. PCT/US2012/027810.
USPTO; Advisory Action dated Jun. 6, 2013 in U.S. Appl. No. 13/466,445.
International Preliminary Report on Patentability dated on Jun. 28, 2013 in Application No. PCT/US2012/027664.
USPTO; Office Action dated Sep. 23, 2013 in U.S. Appl. No. 13/889,307.
USPTO; Advisory Action dated Oct. 4, 2013 in U.S. Appl. No. 13/468,880.
USPTO; Advisory Action dated Oct. 7, 2013 in U.S. Appl. No. 12/857,424.
USPTO; Final Office Action dated Oct. 30, 2013 in U.S. Appl. No. 11/779,734.
USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
www.americanexpress.com/gift Feb. 25, 2005, 2 pages.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 27, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 8, 2012 in Application No. PCT/US2012/021648.

(56) References Cited

OTHER PUBLICATIONS

PCT; International Search Report and Written Opinion dated Jun. 19, 2012 in Application No. PCT/US2012/027810.
PCT; International Search Report and Written Opinion dated Jul. 6, 2012, in Application No. PCT/US2012/027664.
USPTO; Office Action dated Aug. 3, 2012 in U.S. Appl. No. 13/466,412.
USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? Of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
Search Report and Written Opinion dated Feb. 16, 2015 in Singapore Application No. 11201400788P.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Jan. 16, 2015 in U.S. Appl. No. 13/889,299.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Final Office Action dated Jan. 28, 2015 in U.S. Appl. No. 13/889,307.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
Examination Report dated Mar. 24, 2015 in Australian Application No. 2012316453.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
USPTO; Final Office Action dated Apr. 13, 2015 in U.S. Appl. No. 13/734,693.
USPTO; Advisory Action dated Apr. 17, 2015 in U.S. Appl. No. 13/889,307.
USPTO; Final Office Action dated Apr. 8, 2015 in U.S. Appl. No. 13/794,145.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Advisory Action dated May 8, 2015 in U.S. Appl. No. 13/941,306.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Advisory Action dated Jun. 10, 2015 in U.S. Appl. No. 13/477,806.
USPTO; Advisory Action dated Jun. 11, 2015 in U.S. Appl. No. 13/926,789.
Burke, "Hybrid Recommender Systems: Survey and Experiments," User modeling and user-adapted interaction, 2002, Kluwer Academic Publishers, pp. 331-370.
Aimeur et al., "Alambic: a privacy-preserving recommender system for electronic commerce," Feb. 27, 2008, Springer-Verlag, pp. 307-334.

(56) References Cited

OTHER PUBLICATIONS

Tang, "Approac to detection of community's consensus and interest," Institute of Systems Science, 2008, Springer-Verlag, pp. 17-29.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Office Action dated Aug. 28, 2015 in U.S. Appl. No. 13/794,272.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Advisory Action dated Sep. 29, 2015 in U.S. Appl. No. 13/686,608.

\* cited by examiner

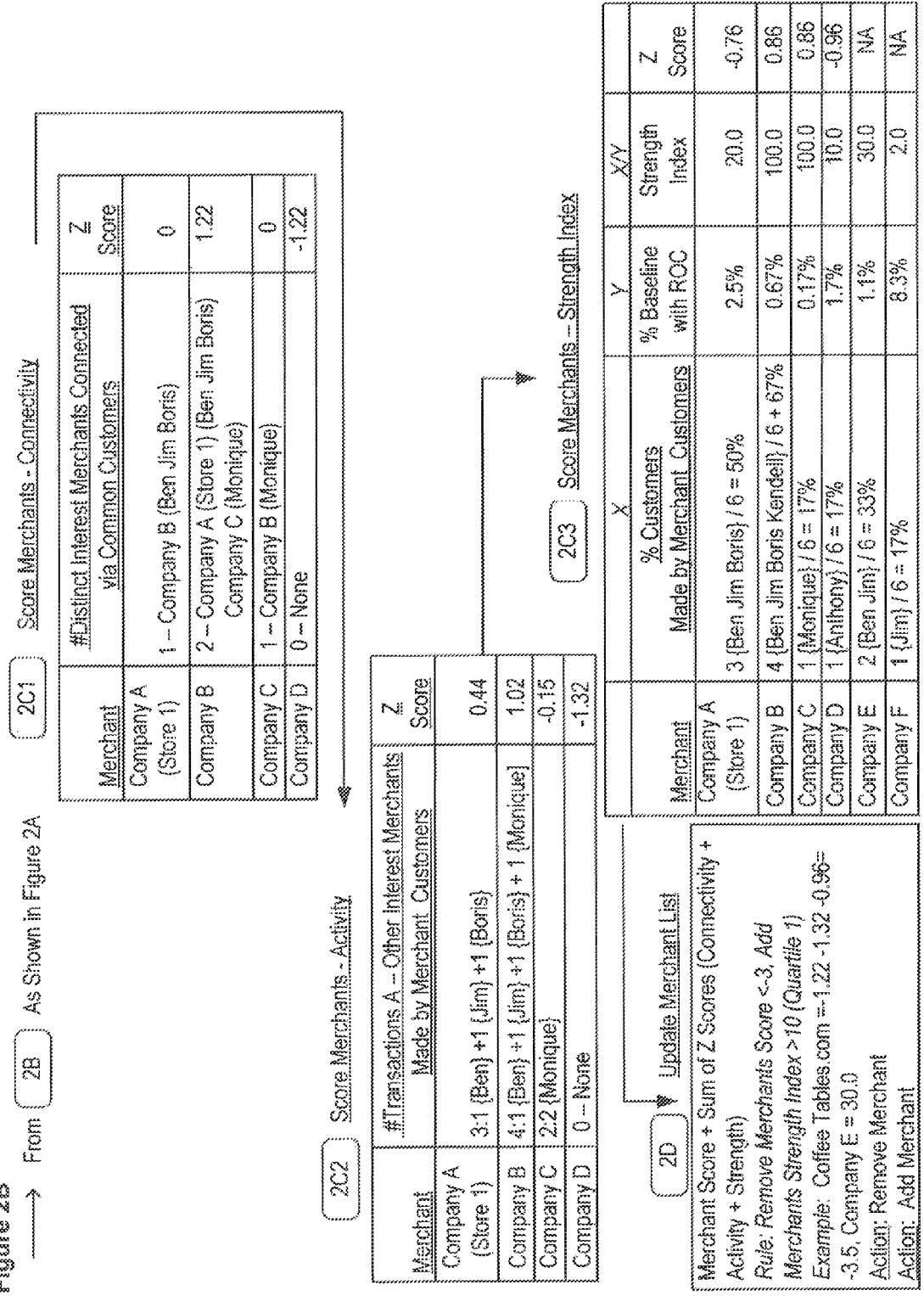

Figure 4 The preliminary merchant score is created to cherry-pick the set of most connected and active merchants. These elite merchants are used to identify 'Booster' customers which help find interest merchants that don't match the Keyword seed.

Preliminary Merchant Score = (A) + (B)

(A) Merchant Network Connectivity - MNC
Avg. No. of other interest Merchants shopped at by an interest merchant's customers.

(B) Merchant Network Activity - MNA
No. of ROCs made by an Interest Merchant's customers at other merchants.

$$MNC_j = \frac{\sum_{i=1}^{I}(CDM_i - 1) : (C_i, M_j) \in T_{INT}}{\sum_{i=1}^{I} 1 : (C_i, M_j) \in T_{INT}}$$

where $CDM_i = \sum_{j=1}^{J} 1 : (C_i, M_j) \in T_{INT}$ $$MNA_j = \sum_{j=1}^{J} 1 : CROCS_i : (C_i, M_j) \in T_{INT} - CROCS_j$$

where $CROCS_i = \sum_{i \in T_{INT}} 1 : (C_i, M_j) \in T_{INT}$ and $MROCS_j = \sum_{i \in T_{INT}} 1 : (C_i, M_j) \in T_{INT}$ $C_i$ – Specific Customer i
$M_j$ – Specific Merchant j
$T_{INT}$ – Set of Interest Transactions

| Merchant | # Cust. in (C) Shopping at other Baseball SEs | # Other SE in (C) where (2) shopped | MNC (3/2) | MNC = # ROCs at (3) | Normalized MNC | Normalized MNA | Prelim. Merchant Score (6+7) |
|---|---|---|---|---|---|---|---|
| COMPANY A | 64 | 117 | 1.84 | 4,967 | 2.51 | 1.68 | 4.19 |
| COMPANY B | 142 | 268 | 1.89 | 1,559 | 2.61 | 0.33 | 2.95 |
| COMPANY C | 300 | 15 | 0.05 | 20 | -1.54 | -0.26 | -1.81 |

Merchants are ranked by the Preliminary score. The bottom 10% of the merchants are not considered for Booster Customer creation as they are not well connected to other Interest Merchants.

The Customer Booster List is created so as to identify additional Baseball merchants via their transactions on them.

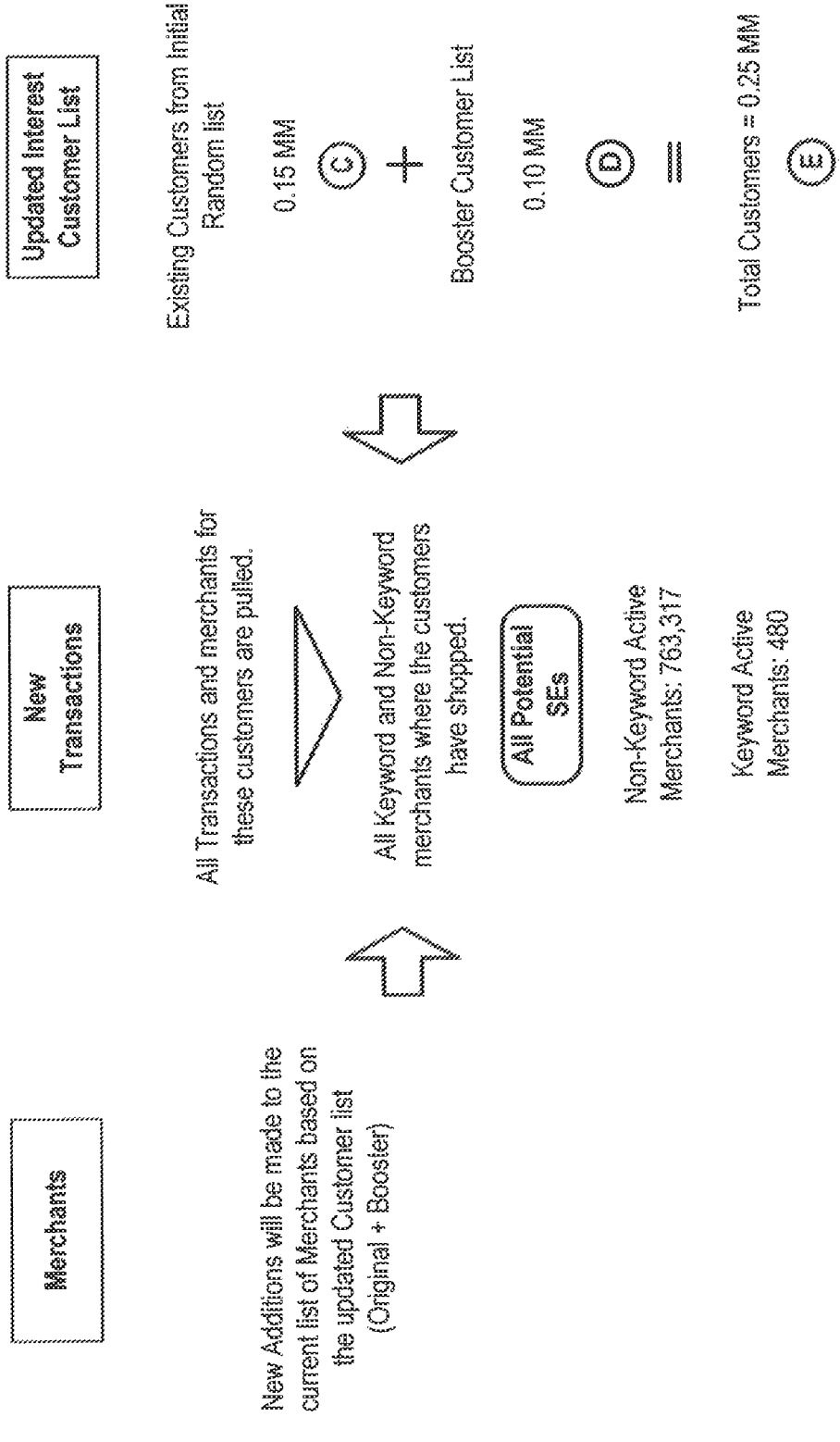

Figure 6B

The Merchant Interest Network score (MINS) helps us select the best Baseball Interest merchants out of the list of 700 K. Merchants with higher MINS are over indexed on customers having Baseball Interest.

$$MINS \bigodot_B \equiv \frac{\text{Baseline Interest Coverage}}{\text{Baseline Coverage}} = \frac{(\% \text{ Baseball customers with 1+ Roc at a Merchant})}{(\% \text{ all Baseline CCSG with 1+ Roc at a Merchant})}$$

$$MINS_j = \frac{\sum_{i=1}^{I} 1: (C_i, M_j) \in T_{INT}}{\frac{Size(C_{INT})}{\sum_{i=1}^{I} 1: (C_i, M_j) \in T_A}}$$

$C_i$ – Specific Customer
$M_j$ – Specific Merchant
$T_{INT}$ – Set of Interest Transactions.

| Column | 1 | 2 | 3 | 4 | 5 |
|---|---|---|---|---|---|
| Merchant | Baseline Coverage (Distinct Cust From CCSG That Shopped) | (1) Over 20 MM Base | Baseball Interest Coverage | Interest #3 Over Sample Size (0.15 MM) | MINS (Column 4/2) |
| COMPANY A | 116,441 | 0.58% | 52,557 | 23.05% | 39.5 |
| COMPANY B | 1,448 | 0.01% | 974 | 0.43% | 59.0 |
| COMPANY C | 658 | 0.00% | 499 | 0.22% | 66.5 |
| COMPANY D | 8,481 | 0.04% | 3,519 | 1.54% | 36.4 |
| COMPANY E | 142 | 0.00% | 79 | 0.03% | 48.8 |
| COMPANY F | 1,252 | 0.01% | 292 | 0.20% | 20.4 |
| COMPANY G | 138 | 0.00% | 29 | 0.00% | 18.4 |

Figure 6C

Merchants are added if either:
- MINS > 25th percentile of kept merchants OR
- MINS > 10th percentile kept merchants AND industry is OK (i.e. -in 'Approved" List).

| Merchant Name | SEIMS Industry | Merchant Description | MINS | Status | Reason for Status |
|---|---|---|---|---|---|
| COMPANY A | Business Service | Fantasy Baseball | 64.9 | Selected | MINS > 29.1 |
| COMPANY B | Charitable Organization | Baseball Charities | 58.9 | Selected | MINS > 29.1 |
| COMPANY C | Recreation Service | Little League Baseball | 50.4 | Selected | MINS > 29.1 |
| COMPANY D | Sporting Goods Store | Sells Wooden Baseball Bats | 28.3 | Selected | MINS 27.1 to 29 and Industry OK |
| COMPANY E | Commercial Sports | Minor League Tickets | 27.7 | Selected | MINS 27.1 to 29 and Industry OK |
| COMPANY F | Sporting Goods Store | Baseball Academy | 27.2 | Selected | MINS 27.1 to 29 and Industry OK |
| COMPANY G | Beauty/Barber Shop | Beauty Supplies | 20.4 | Eliminated | MINS < 27.1 |
| COMPANY H | Commercial Clothing | Diaper Company | 18.4 | Eliminated | MINS < 27.1 |
| COMPANY I | Cleaning/Janitorial | Cleaning Maid Agency | 16.6 | Eliminated | MINS < 27.1 |

* Approved Industry List for adding Baseball merchants using MINS includes 'Commercial Sport', 'Sporting Goods Store', 'Ticket Agency' etc.

Figure 6D
Updated MINS is added to Connectivity and Activity to create the Final Merchant Score.

Merchant Score Ⓒ = Prelim. Merchant Score Ⓐ + Normalized MINS Ⓑ

| Column | 1 | 2 | 3 | |
|---|---|---|---|---|
| Merchant | Prelim. Merchant Score | MINS | Normalized MINS | Merchant Score (Column 1 + 3) |
| COMPANY A | 11.90 | 39.5 | -0.47 | 11.42 |
| COMPANY B | 4.19 | 59.0 | 1.26 | 5.46 |
| COMPANY C | 2.95 | 66.5 | 1.94 | 4.90 |
| COMPANY D | 0.69 | 36.4 | -0.76 | -0.06 |
| COMPANY E | -1.25 | 48.8 | 0.35 | -0.90 |
| COMPANY F | -1.81 | 20.4 | -2.19 | -4.00 |
| COMPANY G | -1.77 | 18.4 | -2.37 | -4.15 |
| ... | ... | ... | ... | ... |

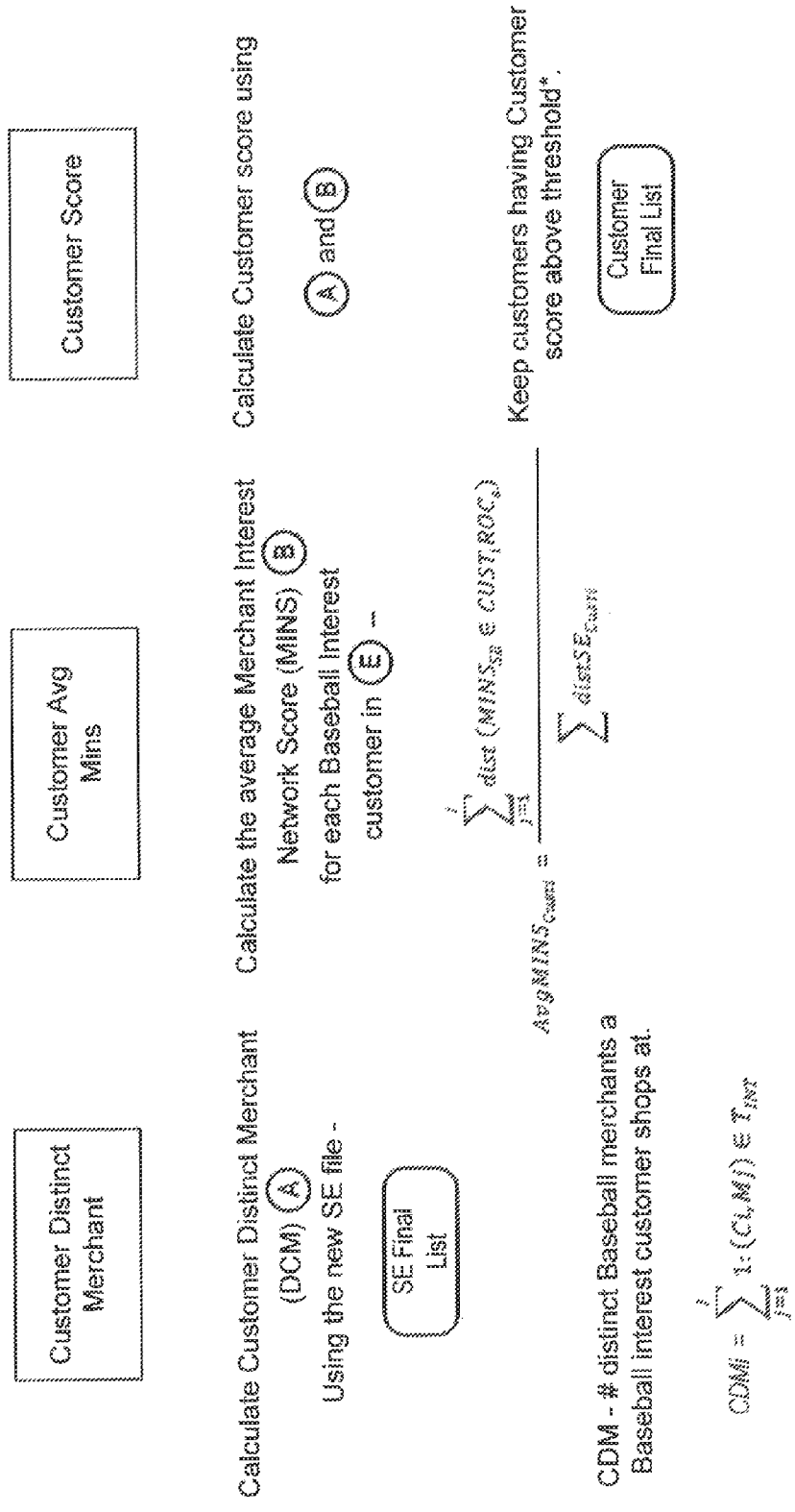

Figure 7B

Customer Score Creation Examples

Customer score ranks all the customers and is used to distinguish a 'Baseball Enthusiast' Vs a Baseball 'Non Enthusiast'.

The customer threshold value for Baseball is 0.80. Customers that met the threshold value and qualify as Enthusiasts in this loop.

| | 1 | 2 | 3 | 4 | 5 | 6 | 7 | |
|---|---|---|---|---|---|---|---|---|
| Customer | # ROC | Total $ | Customer Distinct Merchants (Counts) | Avg. MINS (A) | Z Customer Distinct Merchants (B) (3) | Z Avg. MINS (4) | Customer Score (5+6) | |
| A | 2 | $4.25 | 2 | 58.3 | 0.91 | -0.10 | 0.81 | Enthusiast |
| B | 2 | $2.25 | 2 | 58.3 | 0.91 | -0.10 | 0.81 | |
| C | 2 | $2.25 | 2 | 58.3 | 0.91 | -0.10 | 0.81 | |
| D | 3 | $16.65 | 1 | 83.3 | -0.91 | 1.01 | 0.10 | Non Enthusiast |
| E | 1 | $450.00 | 1 | 22.2 | -0.91 | -1.71 | -2.62 | |

Measures strength of network connectivity

Measures quality of merchants that are connected

Figure 8

The algorithm stops when either:

A) a maximum # of iterations (e.g. 10) is reached
OR
B) Turnover Index falls below a specific threshold (after loop 3)
Turnover Index = (merchants$_{added}$ + merchants$_{dropped}$) / merchants$_{starting}$

| Loop | 1 | 2 | 3 | 4 | 5 | 6 | 7 | 8 | 9 | 10 |
|---|---|---|---|---|---|---|---|---|---|---|
| Starting merchants | 516 | 570 | 612 | 654 | 690 | 717 | 743 | | | |
| Dropped merchants | 20 | 14 | 4 | 7 | 4 | 5 | 6 | | | |
| Added merchants | 74 | 56 | 46 | 43 | 31 | 31 | 25 | | | |
| Net merchant change | 54 | 42 | 42 | 36 | 27 | 26 | 19 | | | |
| Turnover Index | 0.182 | 0.123 | 0.082 | 0.076 | 0.051 | 0.050 | (0.042) | | | |

Baseball merchants: loops 1-10

Figure 9B

| | CM attributes | Restaurant Filters |
|---|---|---|
| Rockstar | Centurion + Platinum<br>Annual Spend > $200k | $$$$<br>Urban<br>Tags: Buzzing, Packed |
| Local | Lives in area | High repeat customer rate |
| On an Expense Account | Out of town<br>Corporate Card | $$$ or $$$$<br>High % out of town<br>High tip %<br>Tags: Courteous, Reliable |
| Don Juan | Platinum | Not good for groups<br>Dinner<br>Tags: Cozy, Classy,<br>(exclude Grimy, Chaotic) |
| Starving Artist | Income < 100k | $ or $$<br>Trending<br>Tags: Good value |
| With the Family | Has kids | Early evening<br>Tags: Accommodating, comfortable |
| Hipster | Age 18-34 | $$$<br>Trending<br>Tags: Retro, Clever |
| Chef | | Late night<br>Tags: Surprising, Memorable |

Personas – Yogis

Personas - Yogis

SYSTEMS AND METHODS FOR AN ANALYSIS CYCLE TO DETERMINE INTEREST MERCHANTS

This application claims priority to and the benefit of U.S. Provisional Patent Application Ser. No. 61/610,461 filed on Mar. 13, 2012 and entitled "GENERATING MERCHANT RECOMMENDATIONS FOR CONSUMERS," which is hereby incorporated by reference in its entirety for all purposes. This application also claims priority to and the benefit of U.S. Provisional Patent Application Ser. No. 61/646,778 filed on May 14, 2012 and entitled "SYSTEMS AND METHODS FOR TAILORED MARKETING BASED ON FILTERING," which is hereby incorporated by reference in its entirety for all purposes. This application also claims priority to and the benefit of U.S. Provisional Patent Application Ser. No. 61/700,850 filed on Sep. 13, 2012 and entitled "SYSTEMS AND METHODS FOR AN ANALYSIS CYCLE TO DETERMINE INTEREST MERCHANTS," which is hereby incorporated by reference in its entirety for all purposes.

FIELD

The present disclosure generally relates to filtering, and more particularly, to processing an analysis cycle to determine interest merchants.

BACKGROUND

With the proliferation of the Internet, as well as the growing popularity of mobile communication devices, marketplaces in which deals (e.g., offers) are exchanged (e.g., purchased and/or sold) have grown over time. This "deals marketplace" has grown quickly, but has encountered a number of challenges. For example, offers are usually poorly tailored to consumers (e.g., these offers are irrelevant or less relevant to consumers), which may lead many consumers to opt out of an option to receive such offers and/or a tendency of consumers to "tune out" or ignore offers that are received. Attempts to tailor offers to general interests (e.g., "sports" or "automotive") may be too generic to generate a response from a consumer. Furthermore, recommendations of merchants to consumers based on generic interests or poorly tailored information results in the recommendations having lower creditability and being ignored or not valued. It would therefore be advantageous to have a system in which one or more merchants are able to accurately tailor relevant offers to one or more consumers. Likewise, it would be advantageous to have a system in which merchant recommendations are more accurately determined and provided to the consumers.

SUMMARY

The present disclosure includes a system, method, and/or article of manufacture (collectively, "systems") for processing an analysis cycle to determine interest merchants. In various embodiments, the method may comprise selecting seed merchant relevant to a topic interest, identifying consumers that have completed a transaction with the seed merchant to generate a list of identified consumers, determining merchants (e.g., all merchants) visited by the identified consumers, scoring the merchants based on at least one of network connectivity, activity, and merchant over index, where the scoring generates a list of scored merchants, updating the seed merchant in response to the list of scored merchants relative to a scoring threshold, and scoring the list of identified consumers based on at least one of a number of distinct merchants in transaction and over-indexing. In various embodiments, the method may further comprise determining whether to perform a second analysis cycle in response to a turnover index. Additionally, the method may further comprise producing a list of updated interest merchants and a list of updated identified consumers, where the updated interest merchants and the updated identified consumers are relevant to the topic interest.

In various embodiments, a group of boost consumers may also be determined. The group of boost consumers may be determined by evaluating consumer transactions across a consumer database, and retrieving consumers that have transactions with two or more distinct merchants. The determination of boost consumers may be included in, and broaden, the step of determining all the merchants visited by the identified consumers.

In various embodiments, the systems are capable of providing recommendations. The systems may be capable of determining a plurality of personas for a first plurality merchants. The plurality of personas may be based on predetermined activates, transaction information from transaction accounts and/or any other suitable data source (e.g., social data). The systems may allow a user to select a persona from the plurality of personas. Based on the selection, the system may determine a subset of total merchants associated with the selected persona and recommend at least a portion of the subset of merchants based on the selected persona.

The system may also allow a user to provide a preference in addition to the selected persona. The preference may further define the subset of merchants or a portion of the subset of merchants. In various embodiments, the recommending may be adjusted by any suitable factors such as, for example, time of day, location, channel, and/or the like.

The persona may be defined by at least one of a hobby and activity. That hobby or activity may not be related to the user, but may be of interest to the user as a way to try a new hobby or activity. The system may further refine merchants associated with a persona based on transaction information and user information.

In various embodiments, the system may be capable of ranking the subset of merchants associated with the selected persona. The system may rank the subset of merchants in any suitable fashion. For example, the ranking may be defined by a plurality of offers associated with the subset of merchants. A first subset of the plurality of offers may comprise a first redemption channel and a second subset of the plurality of offers may comprise a second redemption channel. The ranking may be based on or adjusted by the first redemption channel and/or the second redemption channel. For example, the first redemption channel may require no additional action from the user to receive a benefit and the second redemption channel may require an additional action from the user to receive the benefit. As such, the system may rank the first redemption channel higher than the second redemption channel to promote benefits that are easy for the user to receive. Benefits may include any suitable benefit or reward such as, for example, a monetary credit (e.g., a statement credit, instant discount or rebate, and/or the like) or loyalty points.

In various embodiments, the system may be capable of analyzing the transaction information from the transaction accounts, where the transaction accounts are associated with the first plurality of merchants. Based on this analysis, the system may determine a second plurality of merchants associated with the transaction information. The second plurality of merchants may also be selected based on the transaction information and a SEED merchant. The plurality of total merchants may also comprise the first plurality of merchants and the second plurality of merchants.

BRIEF DESCRIPTION OF THE DRAWINGS

The features and advantages of the present disclosure will become more apparent from the detailed description set forth below when taken in conjunction with the drawings.

FIGS. 2A-2B show an example of an analysis cycle in accordance with various embodiments;

FIG. 4 shows the calculating a preliminary merchant score in an analysis cycle in accordance with various embodiments;

FIGS. 6A-6D show the including of boost consumers in an analysis cycle in accordance with various embodiments;

FIGS. 7A-7B show the calculating of a consumer score in an analysis cycle in accordance with various embodiments;

FIG. 8 shows a turnover index after multiple iterations of an analysis in accordance with various embodiments;

FIG. 9B shows a sample table used to determine merchant personas in accordance with various embodiments;

DETAILED DESCRIPTION

Figure 1:
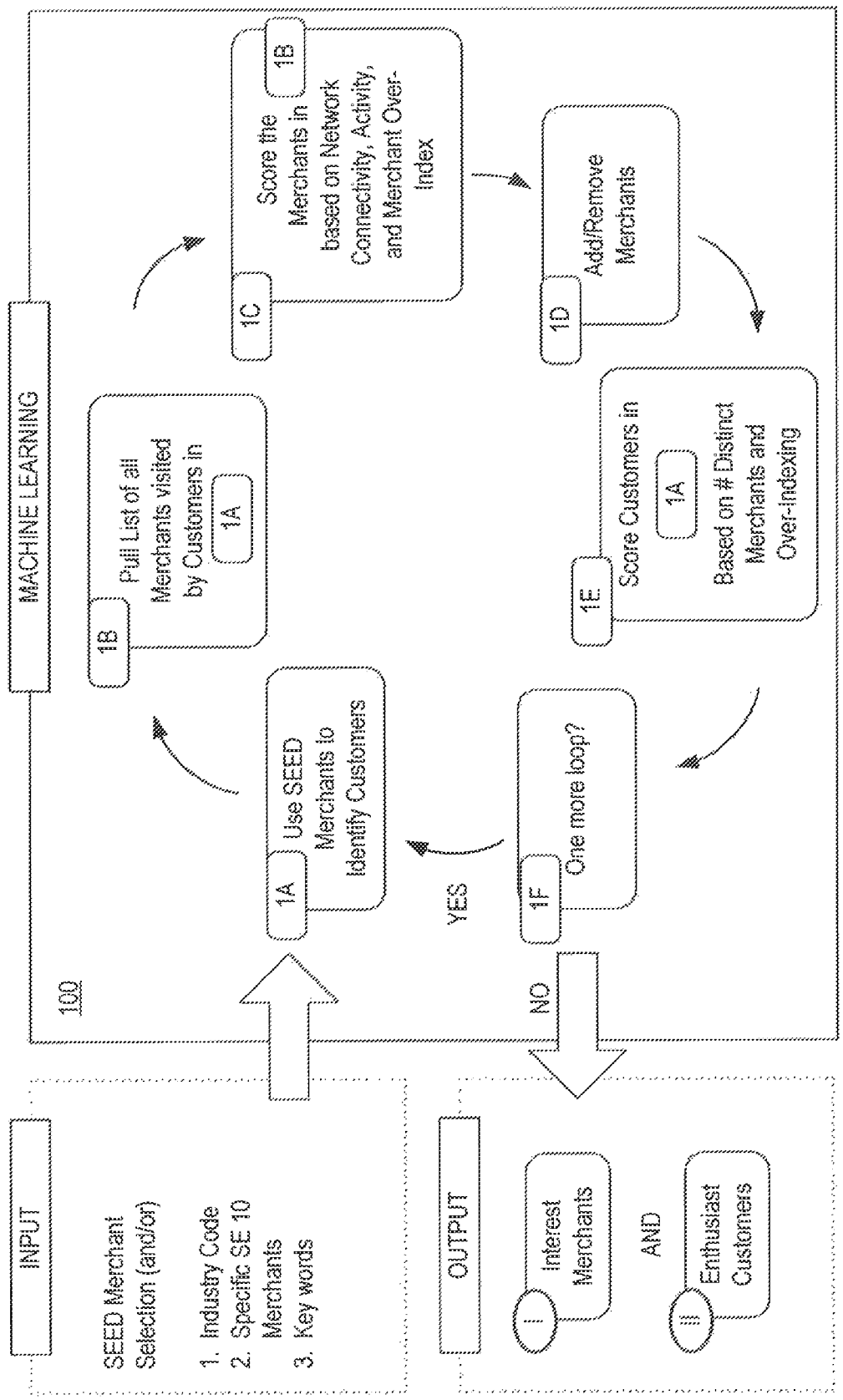
FIG. 1 shows an overview of an analysis cycle in accordance with various embodiments.

The present disclosure generally relates to filtering, and more particularly, to tailored marketing to consumers based on filtering. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Transaction data and network connectivity of both merchants and consumers may be analyzed to generate an interest score for a merchant on a topic at a granular level. The granular level analysis is able to focus on specific topics, instead of simply general topics. For example, a granular level of analysis can score the relevancy of merchants for topics such as baseball or tennis, versus simply determining that a merchant is related to sports generally. Further, such a granular level of analysis is capable of capturing a merchant's network specializing in the specific topic. The specific topic scoring and network analysis can be used to create more relevant consumer interactions by having more relevant results. In accordance with various embodiments, systems and methods are disclosed for identifying consumers and merchants in a systematic, automated, unsupervised manner, without the need to interview consumers, and based on initial, meaningful input.

In general, an item (e.g., a merchant and/or an offer) may be tailored to a consumer based upon a recommender system. In various embodiments, the recommender system (e.g., a collaborative filtering algorithm, an interest analyzer, and/or the like) may identify items that are relevant to one or more consumers and/or one or more merchants. For example, a recommender system may assign a score to one or more items, where the score may be based on information such as a consumer profile, a transaction history associated with a consumer, social data (e.g., data associated with a social media channel, such as FOURSQUARE, FACEBOOK, TWITTER, and the like), demographic data, clickstream data, consumer feedback data, merchant profile, merchant transaction history, and the like. Thus, a score may identify relevant items based upon a variety of information associated with a consumer and/or with a merchant. Moreover, in various embodiments, an item may be tailored to a consumer based on a merchant's needs (e.g., that the merchant is interested in rewarding existing loyal consumers and/or that the merchant would like to acquire new consumers). In other embodiments, an item may be tailored to a consumer based on a consumer's needs. Further still, in various embodiments, an item may be tailored to a particular consumer based upon a business rule, such as, for example, that it is a holiday, that it is a particular time of day, that the consumer is traveling, that the item is associated with a merchant who is some distance away and/or near to from the consumer's location, that the consumer has indicated a preference not to receive the item (e.g., the consumer has given the item a "thumbs down"), and the like.

As used herein, a "merchant" may be any person or entity capable of providing a service or an item. A merchant may distribute the item in any way, for example, by exchanging the item for payment. The merchant may be capable of accepting the payment through any suitable payment channel including traditional payment channels including, for example, POS terminals, online payments terminals, transaction account networks and the like. The merchant may also accept payment through non-traditional payment terminals including, for example, social media channels, person to person payments. Further information about person to person payments is described in U.S. patent application Ser. No. 13/540,216, entitled Systems and Methods for Transferring Value via a Social Network, which is herein incorporated by reference in its entirety.

In various embodiments, and with reference to FIG. 1, an analysis cycle system and method 100 may be any system or method for associating or characterizing items, consumers, and/or merchants. For example, system 100 may be configured to associate items, consumers, or merchants with a persona or a specific interest. System 100 may comprise a process of receiving an input seed of a topic interest 1A, processing the input seed through various steps 1B-1E, and generating interest merchants and enthusiast consumers. An interest merchant may be a merchant determined to be sufficiently active and/or related to the topic of interest. An interest merchant group may be determined by a combination of one or more groupings, which will be described in greater detail below. For example, initially, a list of initial merchants may be retrieved from a merchant database, where a merchant is typically included as a result of a keyword association. Small merchants that were removed from the initial merchant list may be reinstated if the small merchants have sufficient consumer activity. Merchants from a consumer booster merchant list may also be included. The merchants on the consumer booster merchant list may be added if those merchants have sufficient connectivity to specific, topic-related consumers to be deemed an interest merchant. For example, consumer booster merchants may be merchants that score higher than a threshold value.

With respect to Step 1A of FIG. 1, initial aspects of generating a list of interest merchants and enthusiast consumers include determining an initial seed. The initial seed, or search input, may include an industry code, one or more specific merchants, items, offers, behaviors, transaction information and/or keywords (cumulatively referred to as SEED Merchants). The examples discussed below present various recommendations based on SEED Merchants, however, those skilled in the art will appreciate that after reading this application, a SEED Customer may also be used. The SEED Merchants are used to identify consumers that have past transactions with the SEED merchants in order to generate a list of identified consumers. The list of identified consumers is used to retrieve a list of merchants visited by the identified consumers (Step 1B). The list of merchants may include SEED merchants and non-SEED merchants. A time limitation may be included for either the list of identified consumers or the list of merchants. For example, the searches may be limited to transactions occurring within the past 6 months or the past 12 months. Limiting the transaction time period maintains the relevancy of the results to current offerings.

Analysis cycle 100 may further comprise merchant scoring (Step 1C) the merchants in the list of merchants. The merchant scoring facilitates filtering the list of merchants down to appropriate topic interest merchants based on a selected topic, thereby generating a scored merchant list. The scoring may be based on network connectivity, activity, and merchant over-index. The scoring may take into account common consumers and various connectivity metrics.

In Step 1D, the scored merchant list may then be reduced by removing low scoring merchants in order to focus the scored merchant list on the selected topic. In various embodiments, merchants may be removed based on a scoring threshold, within a percentage of the scored merchants, or set number of total merchants. For example, the scoring threshold may be implemented to remove merchants below the scoring threshold from the scored merchant list. In another example, the process may include keeping the top N merchants and removing the rest from the scored merchant list. In yet another example, the percentage criterion may include keeping a set percentage (e.g., 50%). In a further example, the percentage criterion may include keeping all merchants within a percentage of the top merchant score, for example all merchants within 75% of the top merchants score.

In various embodiments and with reference to Step 1E, analysis cycle 100 may include scoring the merchants in the scored merchant list based on a number of distinct merchants and over-indexing. In operation, analysis cycle 100 quantifies a customer's enthusiasm for a particular interest. More particularly, analysis cycle 100 considers the number of distinct merchants where a particular customer shops (e.g., transacts) with, and the merchant strength of each transacting merchant. The merchant strength or over-indexing, noted above, is the ratio of customers with one or more transactions at a given merchant compared to the baseline population of customers. A larger ratio indicates that the merchant provides items that are more relevant to the particular item or interest (e.g., the merchant sells more goods and/or services that are related to a SEED merchant). For example, if customer A and customer B both shop for martial arts supplies, and customer A shops at a merchant with a strength of 100 and customer B shops at a merchant with a strength of 25, analysis cycle 100 will assign more points or weight to customer A's spending behavior (e.g., transactions) with respect to the particular merchant and the analysis as a whole, when identifying boost merchants. In response to the list of merchants being generated, at Step 1F, the analysis cycle 100 can either be repeated, or the finalized merchant list may be used in various other processes.

Figure 2A:
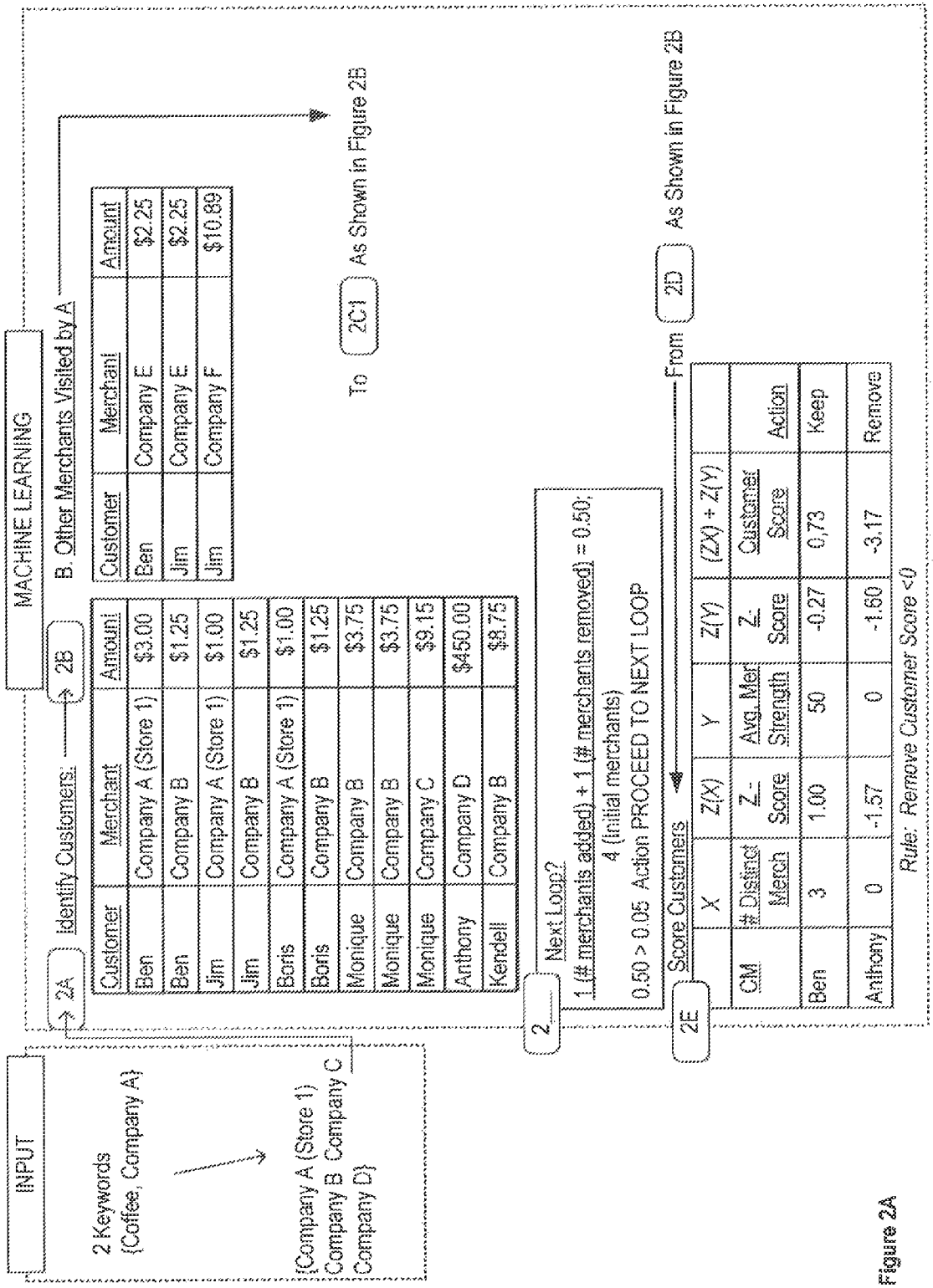

In accordance with various embodiments, FIGS. 2A-2B illustrate an example of the described analysis cycle for one cycle 200. The various exemplary values and combinations will be used below to add further disclosure to the process. In the example, the SEED Merchants are two keywords: coffee and Company A. The keywords generate a list of merchant that are relevant to the SEED Merchant. The result in the example, include, Company A (Store 1), Company B, Company C, and Company D. At Step 2A, the Identify Consumers table shows a list of identified consumers who have past transactions with the SEED Merchants input. In the example, the identified consumers are Ben, Jim, Boris, Monique, Anthony, and Kendell. At Step 2B, other merchants visited by the identified consumers are retrieved from a transaction database. Here, the identified consumer, Ben, visited Company E, in addition to the merchants identified based on the SEED Merchant. The identified consumer, Jim, also visited Company E and Company F, in addition to the merchants identified based on the SEED Merchant. A list of merchants is compiled using both the SEED Merchants and the additional merchants of Company E and Company F.

In various embodiments, the list of merchants can be scored in different ways, such as illustrated in Steps 2C1-2C3. Step 2C1 illustrates a table of merchants scored based on connectivity. The connectivity of a merchant may be determined based on the number of distinct interest merchants connected to the merchant via common consumers. This score may be a 'z-score' or normalized score (a given value (the number of distinct merchants connected by a common customer), subtract the average score (the average distinct merchants connected by a common customer), then divide by the standard deviation. For example, in the context of Company B, the number of distinct merchants connected by a common customer may be 2, the average distinct merchants connected by a common customer may be 1, and the standard deviation may be 0.816497. As a result the z-score is (2−1)/0.816497=1.22. The z-score provides multiple measures on a common scale (e.g., activity or connectivly of large and small merchant can be compared on the same scale). The z-score may also standardize measurements across multiple interests. For example, the z-score provides threshold values that may be applied to interests with different levels. Golf is an interest where golf enthusiast often shop at multiple golf merchants. A higher number of connectivity is used to separate golf merchants from non-golf merchants. In contrast, amateur piloting is an interest where amateur pilots often shop at only a few aviation merchants. A lower number of connectivity may be used to separate amateur pilot merchants from non-amateur pilot merchants. Applying a z-score in both situations enables a threshold value to move with interest since both averages and standard deviations are taken into account when calculating the z-score. The threshold value may be based on normalized values, and therefore adjusts to the type of interest being calculated.

Step 2C2 illustrates a table of merchants scored based on activity. The activity of a merchant may be determined by how active the merchant's consumers are at other interest merchants. For example, Company C; has an activity score of 2 because its consumer Monique was active with two transactions at other interest merchants (two transactions at Company B). By determining a z-score for Company C (e.g., 0.15), the system ensures that the activity or connectivity comparison is evaluated on the same scale.

Step 2C3 illustrates a table of merchants scored based on a strength index. The strength index of a merchant may be determined by comparing the percentage of the identified consumers visiting the merchant and the percentage of a group of control consumers visiting the merchant. In the illustrated table, the column of "% Baseline with ROC" represents a percentage of a group of control consumers visiting the merchant. For example, 2.5% of the control consumer group has transactions with Company A. Therefore, the strength index of Company A is that 50% of the identified consumers have transactions with Company A, and 2.5% of the general group has Company A transactions, yielding a strength index of 20.0 (50%/2.5%).

Step 2D illustrates a step of processing an updated merchant list. A merchant score can be compiled by summing the merchant scores of connectivity, activity, and strength as disclosed in Steps 2C1, 2C2, 2C3. Various merchants can be removed or added to the interest merchant list based on the individual merchant score. For example, merchants with an aggregate score less than −3 may be removed. Merchants with a strength index of greater than 10 may be added to the interest merchant list.

In addition to scoring merchants, the identified consumers may also be scored. As noted above, the customer's enthusiasm for an interest may be calculated. For example, Ben and Shurti each had at least one transaction at two seed merchants (e.g., Company A, Company B) and one new added merchant (Company E). The customer's enthusiasm for the identified interest or the average merchant strength for each of Ben and Shurti may be determined by finding the average strength index for all of the merchants used by Ben or Shurti (e.g., (20 (Company A)+100 (Company B)+30 (Company E))/3=50). This value allows the system to quantify how strong a particular consumer's activity is in a particular interest, as compared to other consumers. In this way, the system may consider the strength of the particular consumer's activity when making recommendations or providing tailored offers.

After an analysis cycle is completed and merchants are added and removed, a determination may be made whether to conduct another analysis cycle or output the finalized lists. In the example, the determination of whether to conduct a second cycle is based on the turnover of the lists. In this example, one merchant (Company E) was added and one merchant (Company D) was removed. Combining for a turnover of two of the four initial merchants resulting in a turnover score of 0.50. A turnover score threshold may be used in the determination. For example, a turnover score threshold of 0.05 is less than the turnover score of 0.50 in the example, and so another analysis cycle will be conducted. The different in the second cycle is that the identified consumer list and the interest merchant list are populated from the results of the first analysis cycle.

In order to provide a better understanding of the disclosed system and method, each of the steps in the analysis cycle will be described in greater detail. In various embodiments, generating an initial list of SEED Merchants begins with selecting the initial seed, or search input, which may include an industry code, one or more specific merchants, or keywords.

The selected keywords may be used to generate an initial list of merchants from various data sources. In accordance with various embodiments, the analysis cycle may access merchant and consumer data relating to spend data (transaction information for purchases of items), non-transactional data (such as social media), loyalty account activity, location data, internet usage tracking data, user profile data (e.g., demographic information), and other suitable data (e.g., time of day, season of year, and the like).

Figure 3A:
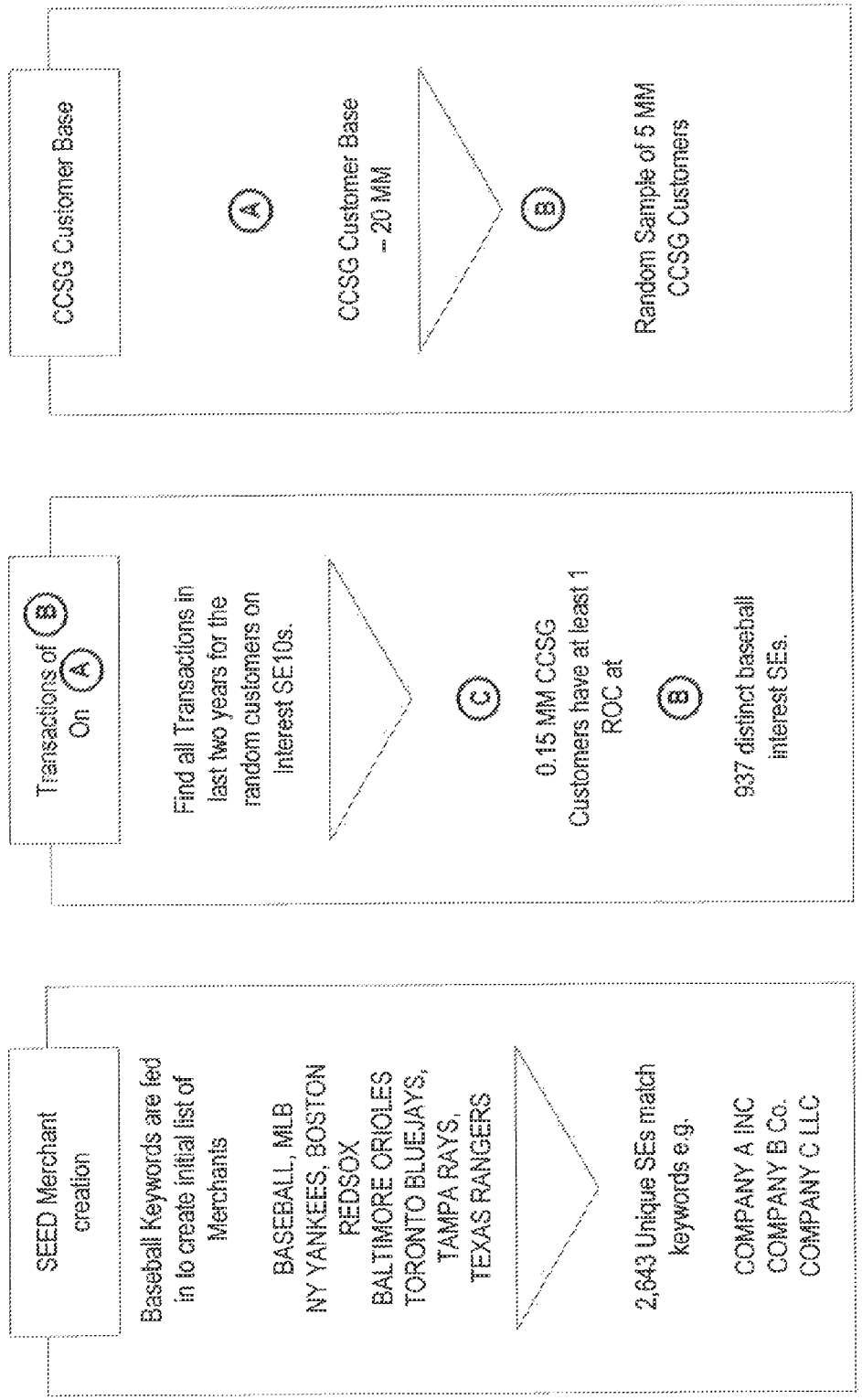
FIGS. 3A-3B show the incorporation of consumers related to seed merchants in an analysis cycle in accordance with various embodiments.

In various embodiments, and with respect to FIG. 3A, baseball is the topic interest and baseball keywords may be used to create an initial list of merchants (2643 merchants in this example). The initial list of merchants may be filtered to generate a list of active merchants by matching transactions records of a random sample from a consumer database with the initial merchants. In the example, a random sample of 5 million consumers from a consumer database having 20 million consumers is used. By cross-referencing the 5 million consumer sample with the 2643 merchants, it is determined that 937 merchants have a least one transaction with a consumer from the random sample. The timeframe of relevant transactions may be a design variable as well, for example, two years as described in FIG. 3A.

Figure 3B:
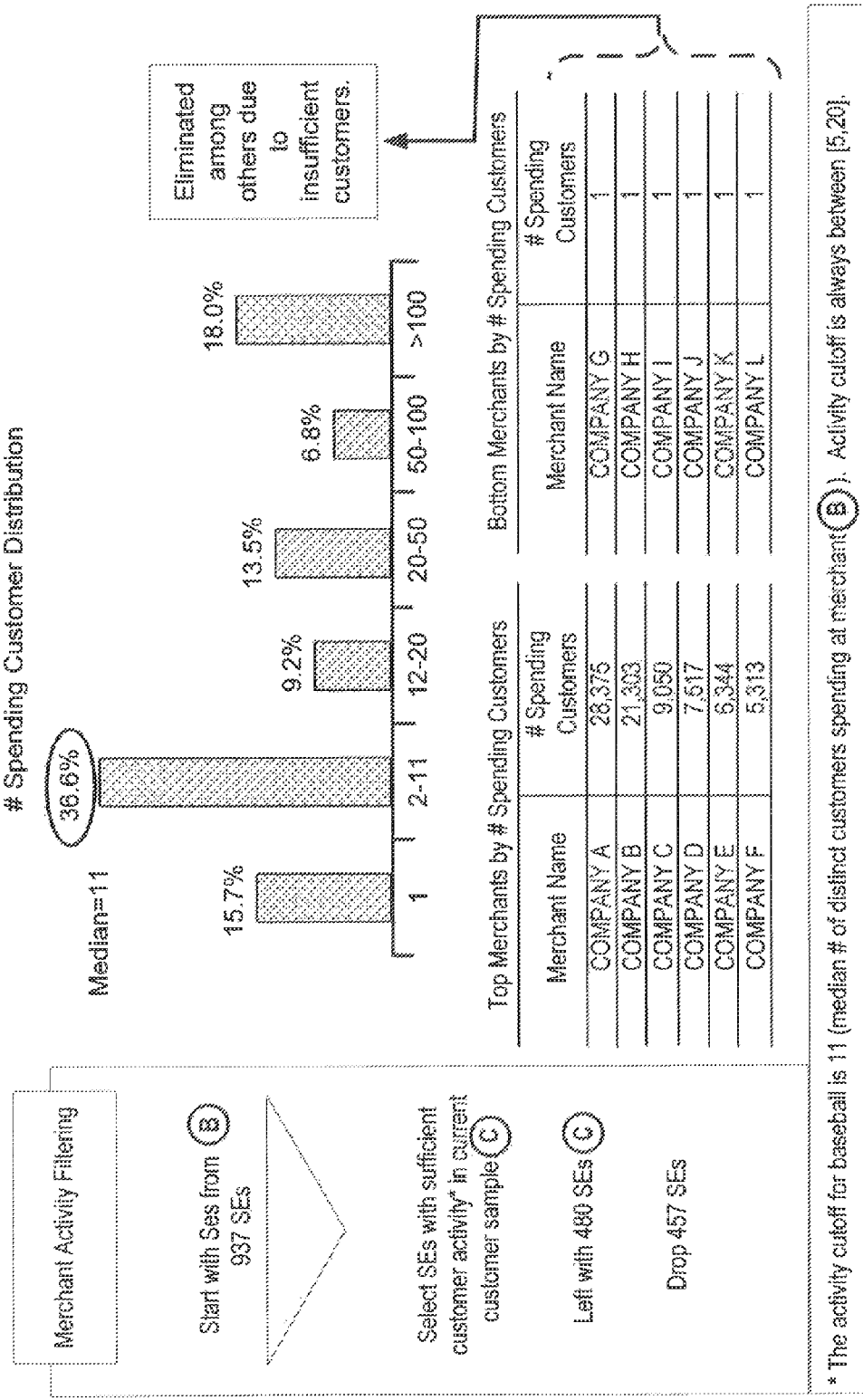

The list of active merchants may be further filtered by deriving whether the merchant conducts sufficient consumer activity with distinct consumers. For example and with reference to FIG. 3B, active merchants with a limited record of distinct spending consumers, such as less than 11, are removed from the merchant list. This threshold may provide other relevant information to the system including, for example, whether an identified merchant is still in business, whether an identified merchant accepts a particular form of payment (e.g., an American Express Card), and/or the like.

In various embodiments and with reference to FIG. 4, an additional filtering step may include calculating a preliminary merchant score in order to determine the most connected and active merchants remaining in the merchant list. In various embodiments, the preliminary merchant score is the sum of a merchant network connectivity (MNC) value and a merchant network activity (MNA) value. The MNC value represents the average number of other Interest Merchants shopped at by an interest merchant's consumers. A specific merchant's MNC value may be calculated as follows:

$$MNCj = \frac{\sum_{i=1}^{I}(CDMi-1):(Ci,Mj)\in \text{Tint}}{\sum_{i=1}^{I}1:(Ci,Mj)\in \text{Tint}}, \text{ where}$$

$$CDMi = \sum_{j=1}^{J}1:(Ci,Mj)\in \text{Tint},$$

where Ci is Specific Consumer i; Mj is Specific Merchant j; and Tint is Set of Interest Transactions.

Furthermore, the MNA value represents the notice of transactions made by an interest merchant's consumers at other merchants. A specific merchant's MNA value may be calculated as follows:

$$MNAj=(\Sigma_{i=1}^{I}CROCSi:(Ci,Mj)\epsilon T\text{int})-MCROCSj,$$
where $CROCSi=\Sigma_{t\epsilon T\text{int}}1:(Ct,Mj)\epsilon T\text{int}$, and where
$MROCSj=\Sigma_{t\epsilon T\text{int}}1:(Ci,Mt)\epsilon T\text{int}$ where Ci is Specific Consumer i; Mj is Specific Merchant j; and Tint is Set of Interest Transactions.

Figure 5A:
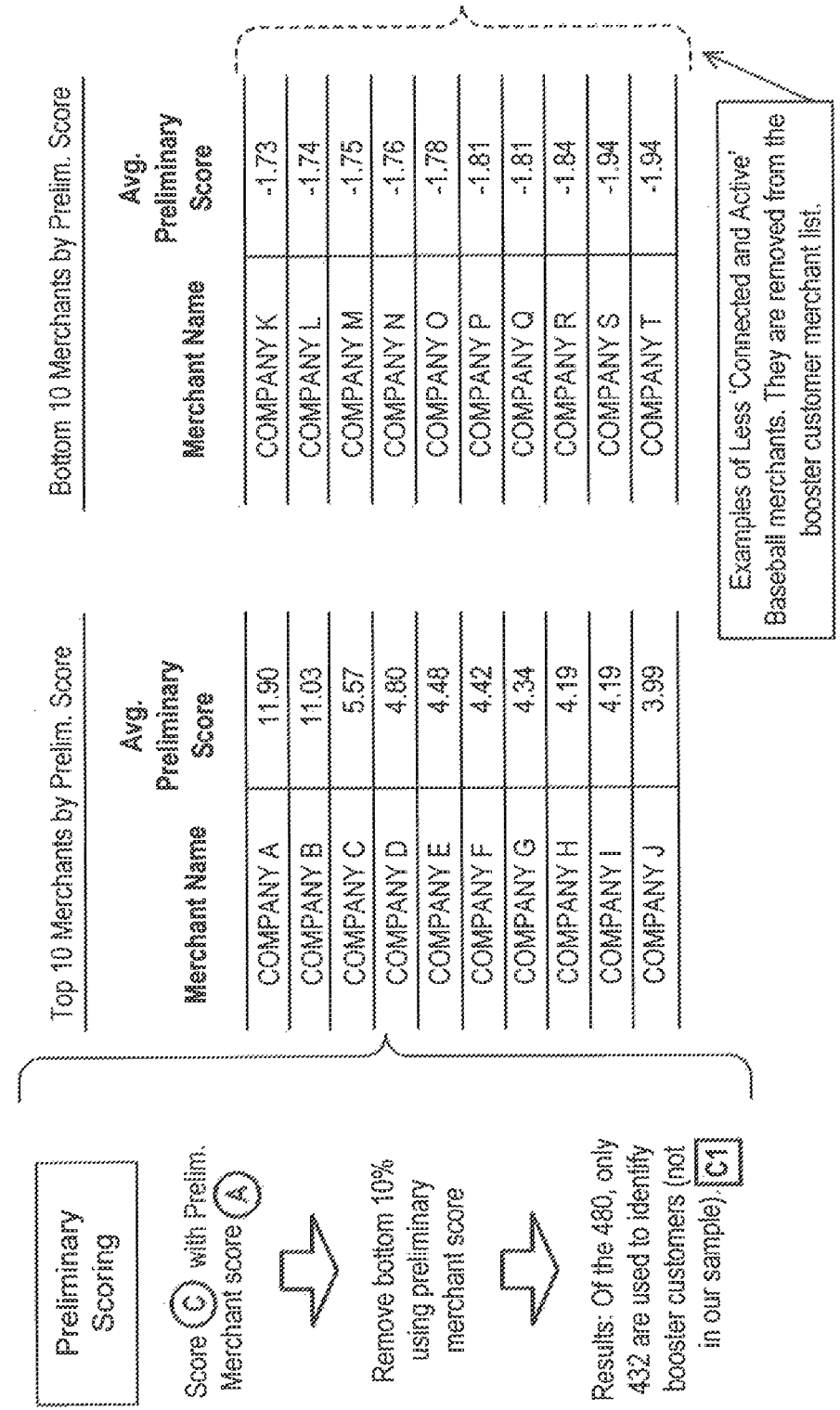
FIGS. 5A-5B show the processing of a preliminary merchant score in an analysis cycle in accordance with various embodiments.
Figure 5B:
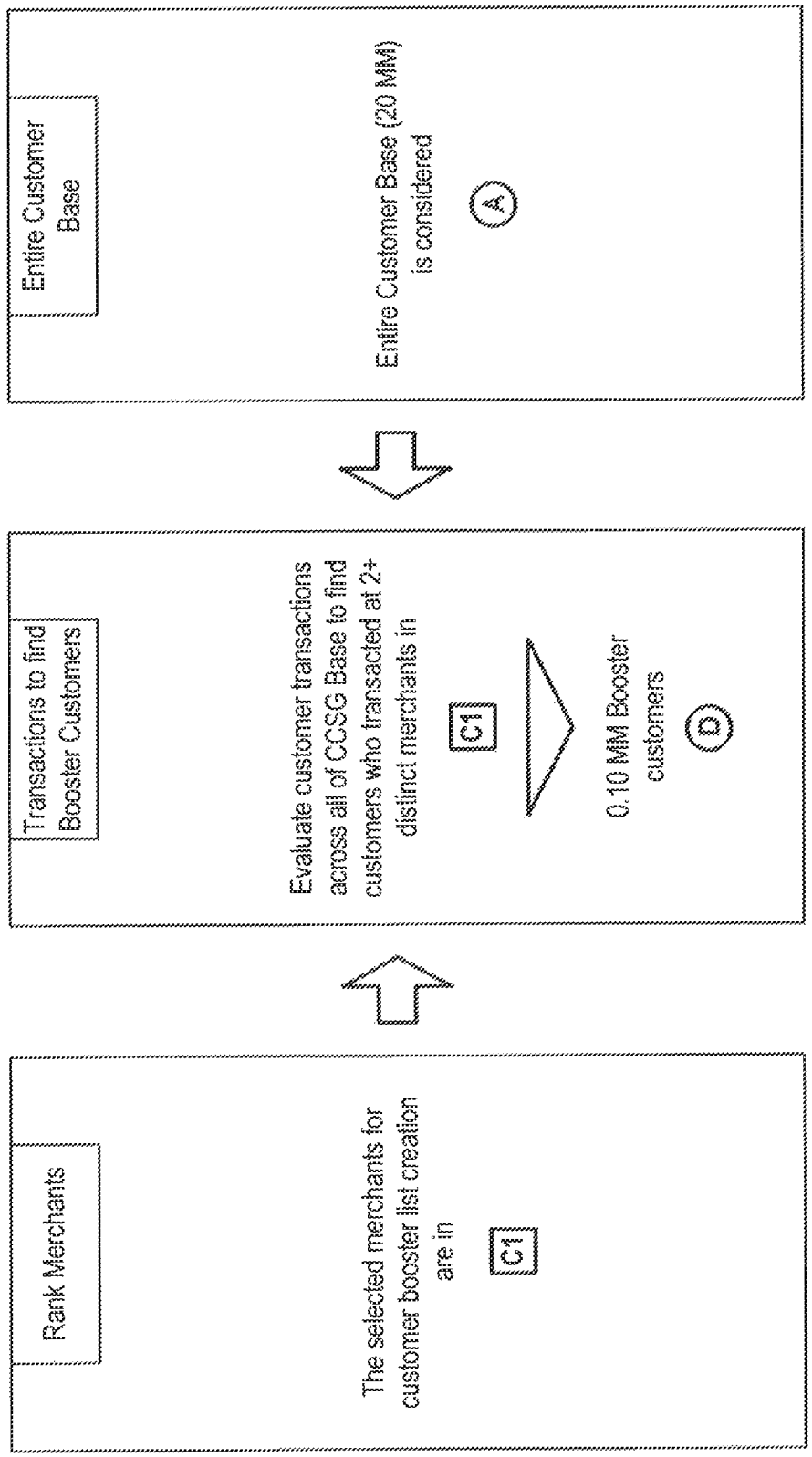

In various embodiments and with reference to FIGS. 5A and 5B, in response to the merchants being ranked by the preliminary merchant score, a preliminary merchant score threshold level is set. The preliminary merchant score may be used to determine which merchants may have done business with a booster consumer. A booster consumer is a consumer that is active and connected to the original interest keyword. For example, a booster consumer may be any consumer that conducted transactions at two or more distinct interest merchants. The booster consumer can help facilitate finding other relevant interest merchants that may not have been included in the initial merchant list. The other relevant interest merchants may have been left off the initial list for a variety of reasons, such as an unrelated business name. In the example illustrated in FIG. 5A, the merchants with a higher preliminary score are well connected to other interest merchants, and the merchants with a lower preliminary score are not well connected to other interest merchants. The bottom 10% of merchants may be removed as being insufficient connected to warrant inclusion in the remaining analysis.

As illustrated in FIG. 5B, a list of booster consumers may be generated by cross-referencing the remaining interest merchants and a consumer database. The consumer database may include the entire consumer database from which the random consumer sample was selected. The cross-referencing may return all consumers which meet criteria, such as transactions with at least two distinct interest merchants or any other suitable rule. The example in FIG. 5B shows 0.10 million booster consumers from the cross-referencing of the entire consumer database of 20 million consumers.

After a list of booster consumer is generated, non-keyword merchants may be added to the interest merchant list. In various embodiments and with reference to FIG. 6A-6D, new additions may be made to the current list of interest merchants based on the updated consumer list, which includes the original consumer list and newly included booster consumers. All transactions including for example, the transactions from the consumers on the updated consumer list are initially retrieved, and a list of merchants is formed. Typically, and as illustrated by FIG. 6A, the list of merchants is much larger than the pending interest merchant list. For example, 763,317 non-keyword merchants are included with the 480 keyword interest merchants.

In various embodiments and with reference to FIG. 6B, a merchant interest network score (MINS) facilitates selecting the appropriate interest merchants from the large list of keyword and non-keyword merchants. Merchants with a higher MINS are over indexed on consumers have a topic interest, such as baseball. In various embodiments, MINS can be calculated as follows:

$$MINS = \frac{\%\ \text{interest customers with 1 or more transactions at a merchant}}{\%\ \text{of baseline database customers with 1 or more transactions at a merchant}},$$

or may be more specifically calculated as follows:

$$MINS = \frac{\sum_{i=1}^{I} 1: (C_i, M_j) \in T_{int}/Size(C_{int})}{\sum_{i=1}^{I} 1: (C_i, M_j) \in T_a/Size(C_a)},$$

where $C_i$ is Specific Consumer $i$, $C_{int}$ is the set of Interest Consumers, $C_a$ is the set of all Consumers, $M_j$ is Specific Merchant $j$, $T_{int}$ is the set of all Interest Transactions, $T_a$ is the set of All Transactions. $(C_i, M_j)$ represents a transaction of Customer $i$ at Merchant $j$. $C_{int}$ is the set of all interest customers, and $C_a$ is the set of all customers.

The MINS of a merchant can be used to filter the merchant list based on various criteria. The determination of whether a MINS is sufficient for selection can vary by topic. In various embodiments, the selection may be a MINS threshold value, an industry type, a combination thereof, and/or any other suitable threshold selection. By way of example and with reference to FIG. 6C, an overall MINS threshold value may be set at 29.1. All the merchants with a MINS value exceeding 29.1 are selected regardless of the industry type. Further, if the merchant is part of an appropriate industry type, then acceptable MINS value may be lower for the merchant associated with the appropriate industry type. For example, if the merchant's industry type is related to sports and the MINS value is at least 27.1, then all merchants matching both criteria (e.g., sports and a MINS value of at least 27.1) are selected. Merchants with an associated appropriate industry type (e.g., sports) and a MINS value of less than 27.1 are eliminated. As such, the system may be configured to provide tiered filtering based on various factors. In this way, a merchant with several relevant factors may be included, even though the strength or value of a particular factor may be lower than a threshold for an individual factor.

In various embodiments and with reference to FIG. 6D, a final merchant score can be calculated for the filtered merchant list. The final merchant score may be a sum of the preliminary merchant score and a normalized MINS. An example of final merchant scores is provided in FIG. 6D.

After various calculations of the analysis cycle, the interest merchant group is determined by a combination of three groupings. First, a list of initial merchants is retrieved from a merchant database, where a merchant is typically included in the results due to keyword association. Merchants with a low final merchant score may be removed from the list. Second, small merchants that were removed from the initial merchant list may be reinstated if the small merchants have sufficient consumer activity. Third, merchants from the consumer booster merchant list may be included. The merchants on the consumer booster merchant list have sufficient connectivity to specific, topic-related consumers to be deemed an interest merchant.

In addition to merchant scoring, the consumers used in the analysis cycle may also be scored. In accordance with various embodiments and with reference to FIG. 7A, a consumer score provides insight into consumers that are active in a specific topic based on transactions associated with the consumers. In various embodiments, a consumer score measures consumer spend activity among interest merchants combined with an average MINS per consumer. The consumer spend activity calculates the number of distinct interest merchants where the consumer has conducted a transaction. A specific time period of activity may be selected to control the scope of the analysis. One exemplary determination of the number of distinct interest merchants may be calculated as follows:

$$CDM_i = \sum_{i=1}^{I} 1:(C_i, M_j) \epsilon T_{int},\ \text{where}\ C_i\ \text{is Specific Consumer}\ I,\ M_j\ \text{is Specific Merchant}\ j,\ \text{and}\ T_{int}\ \text{is Set of Interest Transactions.}$$

Similarly, the average MINS per consumer may be calculated as follows:

$$Avg\ MINScusti = \frac{\sum_{i=1}^{I} dist(MINSse \in CUSTiROCs)}{\sum distSECusti},$$

where CUSTiROCs are the set of Consumer i's transactions; MINSse is a merchant interest network score for interest merchants, and distSECusti is the number of distinct interest merchants shopped at by a customer.

After the consumer score is calculated by summing the consumer spend activity and the average MINS, the consumer score may be compared to a consumer threshold value. The consumer is removed from the boost consumer list if the consumer score is less than the consumer threshold value. In one example, the consumer threshold value may be set at 0.85. FIG. 7B provides an example of consumer scoring, and illustrates how consumer scoring can distinguish between a 'baseball enthusiast' and 'baseball non-enthusiast.'

More specifically, and with reference to FIG. 7B, the threshold value establishes a benchmark that allows consumers to be ranked. Where the consumer is above the threshold, the consumer is considered a 'baseball enthusiast.' Where the consumer is below the threshold, the consumer is considered a 'baseball non-enthusiast.' This delineation or grouping of consumer allows the system to tailor promotions and or offer to specific groups or population (e.g., 'baseball enthusiast' and 'baseball non-enthusiast'), or use the activities of a group or population to understand the interests, spending patterns, and other behaviors of the group (e.g., 'baseball enthusiast' and 'baseball non-enthusiast') or consumers that may be placed in the group based on future spending activity or other behaviors. For example, the system may tailor offers based on a specific category (e.g., baseball) or spending or activity for an identified group. The system may identify and provide offers to the group by any suitable method, including, for example, the system and methods described in U.S. patent application Ser. No. 12/857,389, filed, Aug. 16, 2010, and entitled System and Method for E-Mail Based Rewards, which is incorporated herein by reference in its entirety In various embodiments and with reference to FIG. 8, the analysis cycle can be repeated multiple times until a predetermined limitation is reached. The predetermined limitation may be a set number of iterations to be completed. In various embodiments, the predetermined limitation may be reached once a turnover index falls below a specific threshold. In various embodiments, turnover index=(number of merchants added+number of merchants dropped)/number of merchants starting in the cycle. The turnover index indicates the impact of another cycle on the interest merchant list. A lower turnover index value implies that undergoing another cycle in the process is likely to have a minimal impact on the interest merchant list.

The threshold associated with the turnover index may be any suitable value established by the system. The threshold associated with the turnover index may also be established as a function of the change of the turnover index between iterations. For example, where the percentage of changes or one or more iterations is less than a predetermined value (e.g., 0.050) or a percentage changes (e.g., 20%), the system may automatically indicate that the turnover index is sufficiently low. This indication that the turnover index is sufficiently low indicates that all or the vast majority of interest merchants have been identified. For example, in the example illustrated in FIG. 8, as changes to the turnover index become turnover index decreases over seven cycles, until it reaches 0.042 (e.g., below a predetermined value such as, for example, 0.050).

In various embodiments and as discussed herein, a SEED Customer may be used to one or more interest merchants. Information or characteristics of a customer may be used to determine an appropriate SEED Customer for a selected interest. The system may analyze demographic information about a customer, social data associated with a customer, transaction information associated with a customer, or any other suitable information associated with a customer may be used to select a customer as a SEED Customer. For example, an interest such as, for example, "20-something restaurants" may be identified. Based on the interest, the system may analyze any suitable data (e.g., social data, transaction data, demographic data, and/or the like) associated with customers. The system may identify one of more customer as SEED customers based on the data associated with the customers. Based on the one or more SEED Customers, the system may identify transactions with merchants that would be associated with the interest. Those merchant could be analyzed as discussed herein, to create a list or pool of interest merchants that would be suitably recommendable for the identified interest and the identified customer group (e.g., 20-something customers).

Figure 9A:
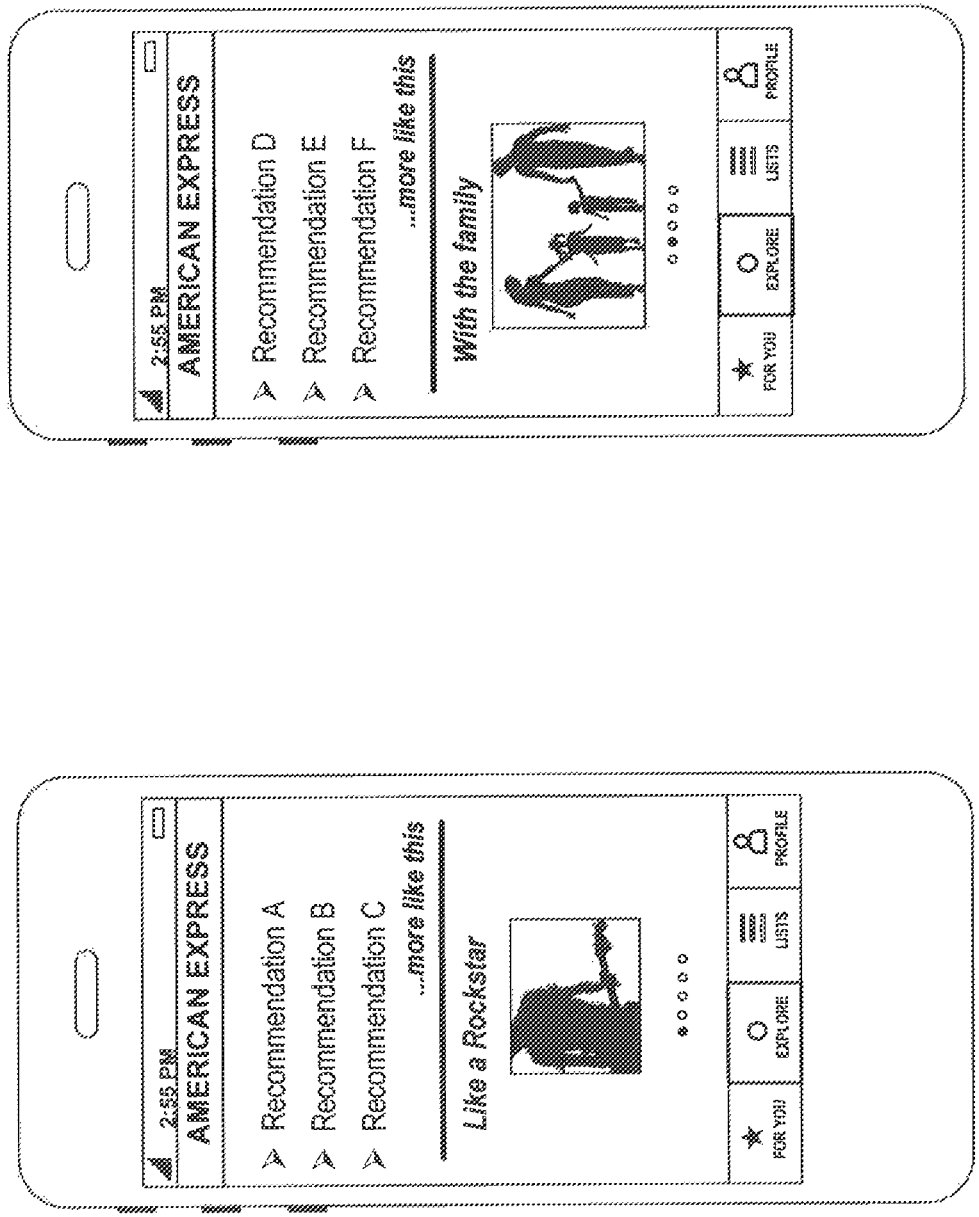
FIG. 9A shows a user display of merchant personas in accordance with various embodiments.

Merchants often desire to select specific consumers for providing offers, as providing offers that are relevant to consumers may result in a higher rate of response. In various embodiments, an assessment of an offer's relevance to a consumer may be determined or adjusted based on a selection of the consumer. For example, the previously described analysis to determine interest enthusiasts and interest merchants is one manner of determining the relevance of specific merchants to specific consumers. Typically, recommendation processes and methods are designed to inform a consumer of offers or merchants that may be of interest based on prior transactions and user information. However, there may be times where a user is looking for a merchant out of the norm. The consumer may be going to dinner with people having different interests. The consumer may also be looking to try something vastly different. Whatever the case may be, often times a consumer will seek recommendations for such unfamiliar merchants. In various embodiments, consumer information and general merchant transaction data may be processed in order to provide recommendations for various categories, or personas. With reference to FIG. 9A, a consumer may request recommendations for family-friendly merchants, or may request recommendations that fit a "Rock Star" persona.

In various embodiments, certain account holder attributes and merchant attributes may be used to determine the "persona" of a merchant. For example, the systems and methods, described in greater detail below, may be configured to capture and characterize consumer data in one or more personas. For example, demographic data or transaction information of a consumer may be initially analyzed to determine what consumer fit predefined personas. The predefined personas may be any lifestyle, interest, hobby, activity, and/or the like. These initial consumers may be identified as the interest consumers used to identify interest merchants as discussed above. Spending patterns and other behaviors of the interest consumers may be used to initial create and then refine an associated list of merchants for each persona.

Persona may be defined in any suitable fashion. Personas may be predetermined based on known demographic data, based on spend data from interest consumers, or based on a combination of interest consumer data and predetermined data. For example, a "Hipster" persona may include demographic data typically associated with a hipster that may be further augmented or adjusted based on spend data associated with interest consumers. The interest consumers may be selected and/or associated with a particular persona based on the predefined demographic data or transaction information that indicates that the interest consumer could if the Hipster persona.

Once the persona has been created and populated with associated merchants that are relevant to the persona, the persona may be stored such that it is searchable, presentable, and/or selectable by a consumer. The consumer selecting the persona may be any suitable consumer. Typically, the consumer will be a non-interest consumer that is seeking a recommendation for an item that the consumer would not normally seek. By selecting a particular persona (e.g., a Hipster persona), the consumer may be presenting with recommendations for various items (e.g., restaurants, leisure activities, goods, services, and/or the like). The recommendations may be tailored based on predetermined inputs or preferences (e.g., a search that lead to the initial persona selection) or dynamically determined inputs (e.g., inputs from the consumer in real-time and after the initial selection of the persona).

Based on these selections and inputs, the system provides recommendations for various merchants that have been previously associated with the persona. For example and with reference to FIG. 9B, the Hipster persona may result in recommendations for merchants that are trending upwards in loyalty, have been tagged with "retro" and "clever", are at a price range of $$$, and are frequented by account holders in the age range of 19-34. Similarly, a "Starving Artist" persona may result in recommendations for merchants that are trending upwards in loyalty, tagged with "good value", are at a price range of $ or $$, and are frequented by account holders with an income less than $100,000 or other range. The trending characteristics helps differentiate between data that is recent versus data that is 6-12 months old or older.

Figure 10A:
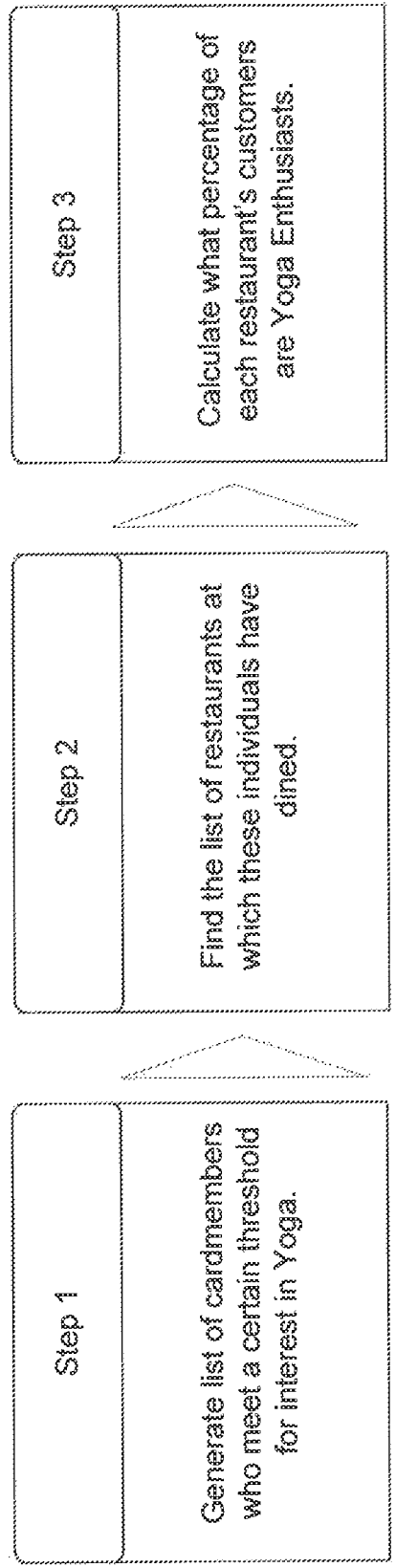
FIG. 10A-10B shows a method of determining a merchant persona in accordance with various embodiments.
Figure 10B:
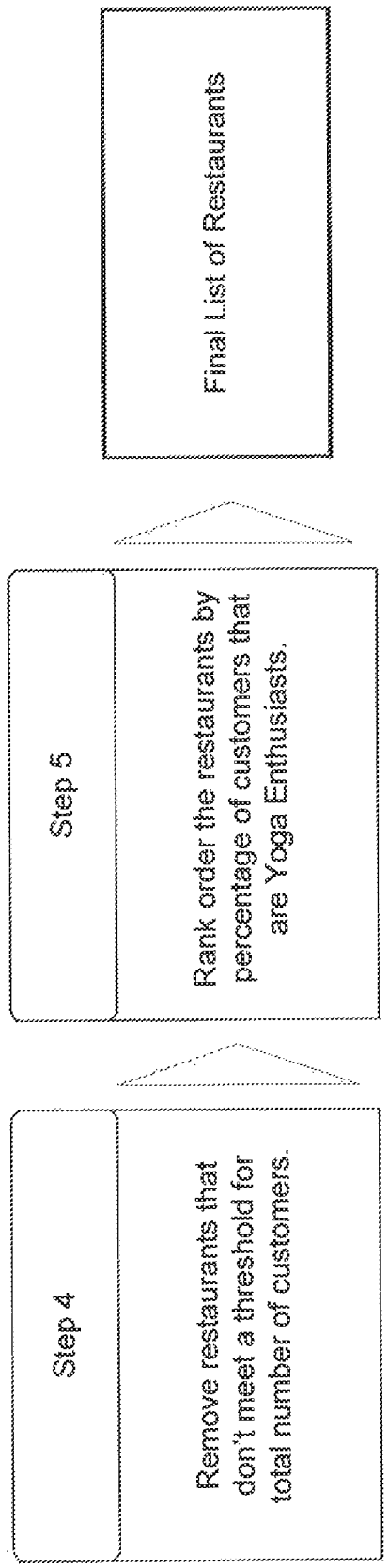

As a part of persona recommendations, a consumer may be presented not only with a merchant that fits a persona, such as a restaurant, but also with various types of merchants that meet the same persona. In various embodiments and with reference to FIG. 10A-10B, a persona categorization method may include generating a list of consumers who meet a certain interest topic, such as yoga. The method may include finding a list of restaurants at which these selected consumers have dined, and calculating what percentage of each restaurant's consumers are the selected account holders (e.g., yoga enthusiasts). Further, the method may include removing various restaurants from the list that do not meet a threshold for total number of selected consumers, rank ordering the restaurants by percentage of selected consumers (e.g., yoga enthusiasts), and generating a final list of restaurants categorized by the certain interest. In addition to restaurants, the method may also be applied to retailers and other merchants frequented by a sufficient number and percentage of consumers to qualify as having a "persona". Moreover, a merchant may have more than one persona, depending on the overall consumer type.

As described herein, recommendations or offers may be ranked using any suitable factors. For example, a persona may comprise a plurality of recommendations. These recommendations may be ranked and/or presented to a consumer using any suitable factors, based on the channel being accessed by the consumer. The channel may also contribute through the ranking. For example, the system presenting the personas may also monitor activity of a user associated with the channel, such that the system understands that the particular consumer's tendencies in response to the consumer accessing the channel. For example, if a threshold percentage (e.g., 90%) of consumer activity in a particular channel is related to a particular item (e.g., restaurant reconditions, "buy one/get one" offers, item discounts, and/or the like), the system may adjust the ranking of identified offers for a particular persona based on the channel.

The system may also consider whether a restaurant recommendation includes an associated reward offer or discount. For example, the system may identify for recommendation 20 restaurants associated with a particular persona. The system may then identify that a certain number of those restaurants also offer a discount that can be associated with the recommendation. The system may rank recommendations with associated offers higher than recommendations without offers, to encourage a customer to use the system or take advantage of a particular offer.

The system may also rank or sort recommendations based on the sponsoring entity. For example, if a particular merchant is associated with or partnered with the system, the system may elevate the ranking of a recommendation for the partner merchant. Similarly, the system may consider whether an offer is sponsored by a merchant or sponsored by an entity associated with the system and rank the offer based on that factor accordingly. The system may also consider a reward associated with the offer as part of the ranking of various offers. For example, the system may identify that a certain subset of offers include a reward of loyalty points and others include a reward of a discount (e.g., a statement credit, authorization credit, instant rebate, discount, POS discount and/or the like). If the consumer is not a loyalty account member, the system may rank offers that provide a discount, higher than offers that provide loyalty point rewards. The system may also rank offers that provide loyalty points higher, to encourage the consumer to join the loyalty program.

In various embodiments of recommendation processes and operations, social data may be used to determine how an item is displayed to a consumer or to modify a predetermined ranking. Such data may be used to adjust or revise persona recommendations as previously described. The social data may be incorporated to generate a more robust, timely "persona" to include in the persona recommendations. Furthermore, in accordance with various embodiments, social data may also be incorporated into recommendation engines for generating recommendations for a consumer based on the consumer's transaction data and/or social data. In various embodiments, social data alone may be sufficient to generate specific consumer recommendations.

For example, in various embodiments, an offer presented through FACEBOOK may comprise or be associated with criteria (e.g., keywords, metadata, and/or the like). Social data from FACEBOOK may be captured and compared to the criteria. Where there is a match between the criteria and the social data, the offer may be ranked higher or be displayed more prominently based on the match. Business rules may be employed to define how a match is determined. The business rules may require that the social data partially match the criteria. The business rules may require that the social data exactly match the criteria. An exact match may be required to adjust the ranking of an offer (where the offer was previously ranked based on other data associated with the consumer) to ensure that the social data adjusts the ranking in a manner that is relevant and desirable for the consumer.

For example, company A may have a FACEBOOK page that a consumer can "like." Another party may also have a FACEBOOK page that is critical of company A that a consumer can "like." If the consumer "likes" company A's FACEBOOK page that social data may be used to promote or adjust the rankings of an offer from company A based on the direct match. However, if the consumer "likes" the FACEBOOK page that is critical of company A, the social data may be ignored with respect to the ranking of an offer from company A or may be used to lower the ranking of the offer from company A.

Rankings of offers may also be adjusted based on other types of social data such as consumer broadcasts. For example, a consumer using TWITTER may broadcast tweets comprising hashtags or particular keywords (e.g., baseball without a hashtag or "#"). The hashtag or keyword data may be captured and used to adjust offers associated with the hashtag or keyword. The hashtag or keyword may be compared to criteria associated with the offer. The hashtag or keyword may also be evaluated to identify a consumer's interest, hobby, or preference. This knowledge of the consumer may affect the ranking of particular offers associated with the interest, hobby, or preference (e.g., if an offer is relevant to a particular consumer, the ranking of the offer may be increased).

Figure 11:
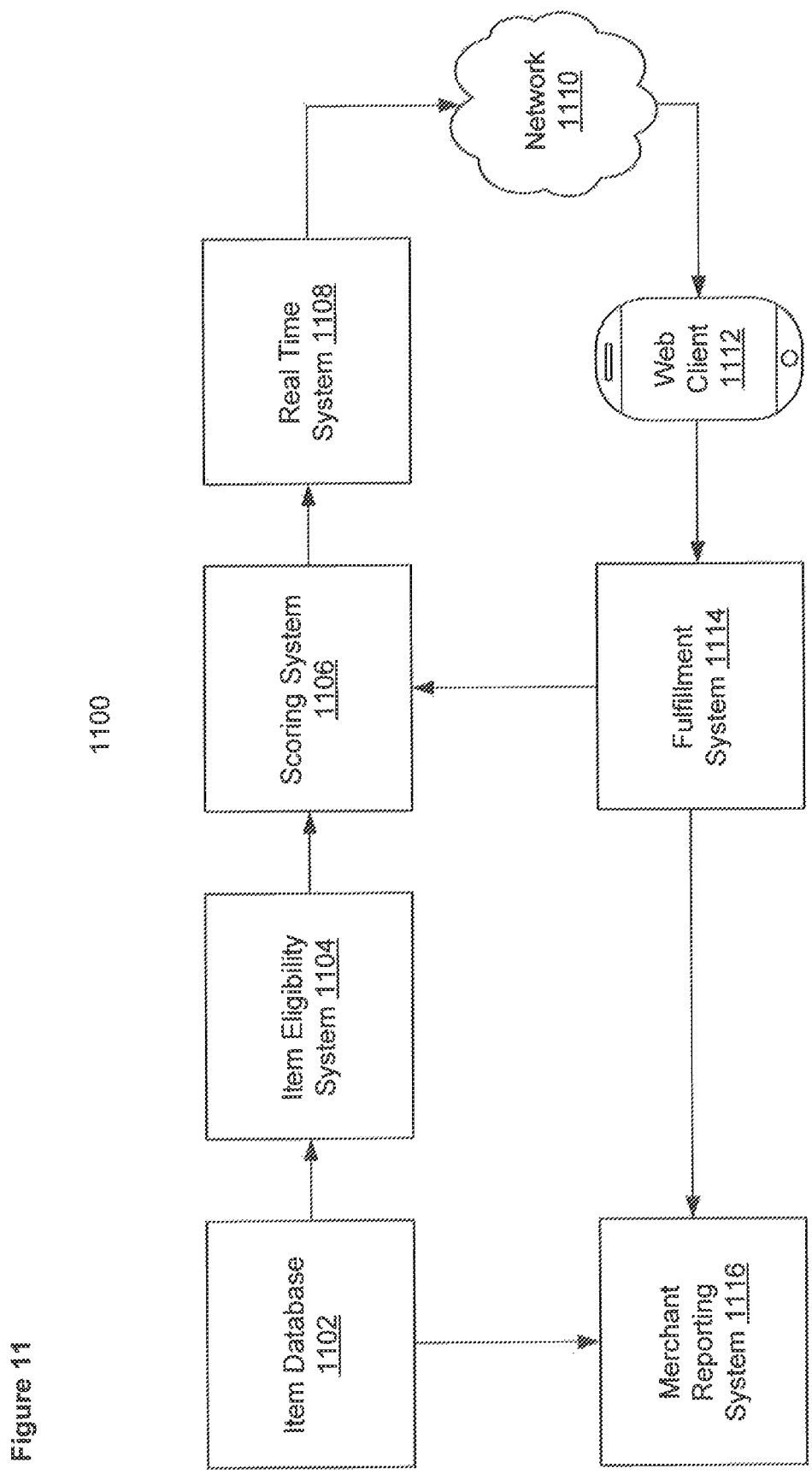
FIG. 11 shows an exemplary system diagram, in accordance with various embodiments.

Accordingly, and with reference to FIG. 11, an exemplary system 1100 for tailoring or recommending an item (e.g., an offer, a merchant, a restaurant, etc.) to a consumer is disclosed. In various embodiments, system 1100 may comprise an item database 1102, an item eligibility system 1104, a scoring system 1106, a real time system 1108, network 1110, a web client 1112, a fulfillment system 1114, and/or a merchant system 1116.

An item database 1102 may comprise hardware and/or software capable of storing data. For example, an item database 102 may comprise a server appliance running a suitable server operating system (e.g., MICROSOFT INTERNET INFORMATION SERVICES or, "IIS") and having database software (e.g., ORACLE) installed thereon. In various embodiments, an item database 1102 may store one or more items, such as one or more offers, associated, for example, with one or more merchants, information associated with one or more merchants, and the like.

An item eligibility system 1104 may comprise hardware and/or software capable of determining whether a consumer is eligible to receive an item and/or information related to an item (e.g., an offer, information associated with a merchant). For example, in various embodiments, an item eligibility system 1104 may determine that a consumer is ineligible to receive an offer based upon a partnership and/or an affiliation associated with a transaction account of the consumer (e.g., an AMERICAN EXPRESS DELTA SKYMILES consumer may be ineligible to receive an offer on an airline that is not DELTA AIRLINES).

A scoring system 1106 may comprise hardware and/or software capable of scoring an item. For example, in various embodiments (as described herein), a scoring system 1106 may analyze a variety of consumer information to score an item, such as an offer and/or a merchant. Moreover, in certain embodiments scoring system 1106 may comprise a variety of "closed loop" or internal data associated with a consumer (e.g., as described herein).

A real time system 1108 may comprise hardware and/or software capable of adjusting the relevance of an item (e.g., a scored offer and/or merchant) based upon a variety of criteria, such as one or more merchant criteria, one or more business rules, and the like. For example, as described herein, a real time system 1108 may adjust the relevance of an offer based upon a merchant interest in acquiring new consumers, a merchant interest in rewarding loyal consumers, a holiday, a particular time of day, that the consumer is traveling, that the offer is associated with a merchant who is some distance away from and/or near to the consumer's location, that the consumer has indicated a preference not to receive an offer (e.g., the consumer has given the offer a "thumbs down"), and the like.

A network 1110 may include any electronic communications system or method which incorporates hardware and/or software components (e.g. a "cloud" or "cloud computing" system, as described herein). Communication among parties via network 1110 may be accomplished through any suitable communication channels, such as, for example, a telephone network, an extranet, an intranet, Internet, point of interaction device (point of sale device, personal digital assistant (e.g., IPHONE, PALM PILOT, BLACKBERRY cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system 1100 is frequently described herein as being implemented with TCP/IP communications protocols, the system may also be implemented using IPX, APPLETALK, IP-6, NetBIOS, OSI, any tunneling protocol (e.g. IPsec, SSH), or any number of existing or future protocols. If network 1110 is in the nature of a public network, such as the Internet, it may be advantageous to presume network 1110 to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently and separately or collectively suitably coupled to network 1110 via data links which include, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that network 1110 may be implemented variously, such as, for example, as an interactive television (ITV) network. Moreover, this disclosure contemplates the use, sale or distribution of any goods, services or information over any network having similar functionality described herein.

As used herein, a "cloud" or "cloud computing" may describe a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Web client 1112 may include any device (e.g., a personal computer, a mobile communications device, and the like) which communicates via any network, for example such as those discussed herein. Web client 1112 may include one or more browsers or browser applications and/or application programs, including browser applications comprising Internet browsing software installed within a computing unit or a system to conduct online transactions and/or communications. For example, in various embodiments, web client 1112 may include (and run) MICROSOFT INTERNET EXPLORER, MOZILLA FIREFOX, GOOGLE CHROME, APPLE SAFARI, and/or any software package available for browsing the Internet.

A computing unit or system may take the form of a computer or set of computers, although other types of computing units or systems may be used, including tablets, laptops, notebooks, hand held computers, personal digital assistants, cellular phones, smart phones, set-top boxes, workstations, computer-servers, main frame computers, mini-computers, PC servers, pervasive computers, network sets of computers, personal computers, such as IPADs, IMACs, and MACBOOKS, kiosks, terminals, point of sale (POS) devices and/or terminals, televisions, GPS receivers, in-dash vehicle displays, and/or any other device capable of receiving data over a network. The computing unit of the web client 1112 may be further equipped with an Internet browser connected to the Internet or an intranet using standard dial-up, cable, DSL or any other Internet protocol known in the art. Transactions originating at a web client 1112 may pass through a firewall in order to prevent unauthorized access from users of other networks. Further, additional firewalls may be deployed between the varying components of system 1100 to further enhance security.

In various embodiments, web client 1112 may or may not be in direct contact with an application server. For example, web client 1112 may access the services of an application server through another server and/or hardware component, which may have a direct or indirect connection to an Internet server. For example, web client 1112 may communicate with an application server via a load balancer and/or a web server. In an exemplary embodiment, access is through a network or the Internet through a commercially-available web-browser software package.

Web client 1112 may further include an operating system (e.g., WINDOWS NT/95/98/2000/XP/VISTA/7/8/CE/MOBILE, OS2, UNIX, Linux, SOLARIS, MACOS, PALMOS, etc.) as well as various conventional support software and drivers typically associated with computers. Web client 1112 may be in a home or business environment with access to a network. Web client 1112 may implement security protocols such as Secure Sockets Layer (SSL) and Transport Layer Security (TLS). Web client 1112 may further implement several application layer protocols including http, https, ftp, and sftp.

A fulfillment system 1114 may comprise any hardware and/or software capable of fulfilling and/or facilitating the fulfillment. For instance, a fulfillment system 1114 may, in various embodiments, comprise hardware and/or software capable of fulfilling and/or facilitating fulfillment of an offer. In various embodiments, a fulfillment system 1114 may comprise a system, such as a system described in U.S. patent application Ser. No. 11/779,734, filed, Jul. 18, 2007, and entitled Loyalty Incentive Program Using Transaction Cards, which is incorporated herein by reference in its entirety. In addition, in various embodiments, a fulfillment system 1114 may comprise a system, such as a system described in U.S. patent application Ser. No. 12/857,389, filed, Aug. 16, 2010, and entitled System and Method for E-Mail Based Rewards, which is incorporated herein by reference in its entirety. In various embodiments, a fulfillment system 1114 may comprise a system, such as a system described in U.S. patent application Ser. No. 13/153,890, filed, Jun. 6, 2011, and entitled System and Method for Administering Marketing Programs, which is incorporated herein by reference in its entirety. In various embodiments, a fulfillment system 1114 may comprise a system, such as a system described in U.S. patent application Ser. No. 13/021,327, filed, Feb. 4, 2011, and entitled Systems and Methods for Providing Location Based Coupon-Less Offers to Registered Account holders, which is incorporated herein by reference in its entirety. In various embodiments, a fulfillment system 1114 may comprise a system, such as a system described in U.S. patent application Ser. No. 13/153,890, filed, Jun. 6, 2011, and entitled System and Method for Administering Marketing Programs, which is incorporated herein by reference in its entirety. In various embodiments, a fulfillment system 114 may comprise a system, such as a system described in U.S. patent application Ser. No. 13/188,693, filed, Jul. 22, 2011, and entitled System and Method for Coupon-Less Product Level Discounts, which is incorporated herein by reference in its entirety. In various embodiments, a fulfillment system 1114 may comprise a system, such as a system described in U.S. patent application Ser. No. 13/411,281, filed, Mar. 2, 2012, and entitled System and Method for Providing Coupon-Less Discounts Based on a User Broadcasted Message, which is incorporated herein by reference in its entirety. In various embodiments, a fulfillment system 1114 may comprise a system, such as a system described in U.S. patent application Ser. No. 13/439,768, filed, Apr. 4, 2012, and entitled System and Method for Providing International Coupon-Less Discounts, which is incorporated herein by reference in its entirety.

A merchant reporting system 1116 may comprise any hardware and/or software capable of generating a report and/or providing a report to a merchant. For example, in various embodiments, a merchant reporting system 1116 may generate a report illustrating a ROI received by the merchant as the result of a tailored marketing campaign.

In various embodiments, the recommendations and/or interests may be configured as an input of an output. For example, the recommendations and/or interests may be configured as initial inputs to a system that is configured to provide specific tailored offers for individual customers, consumers, members, users and/or the like, including the system described in U.S. Provisional Application 61/646,778 filed on May 14, 2012 and entitled "SYSTEMS AND METHODS FOR TAILORED MARKETING BASED ON FILTERING," (hereinafter, the "'778 Provisional") which is herein incorporated by reference in its entirety. The specific tailored offers and/or recommendations produced by an appropriate system may also be inputs or SEED Merchants for a recommender system, such as the system described in '778 Provisional.

Figure 12:
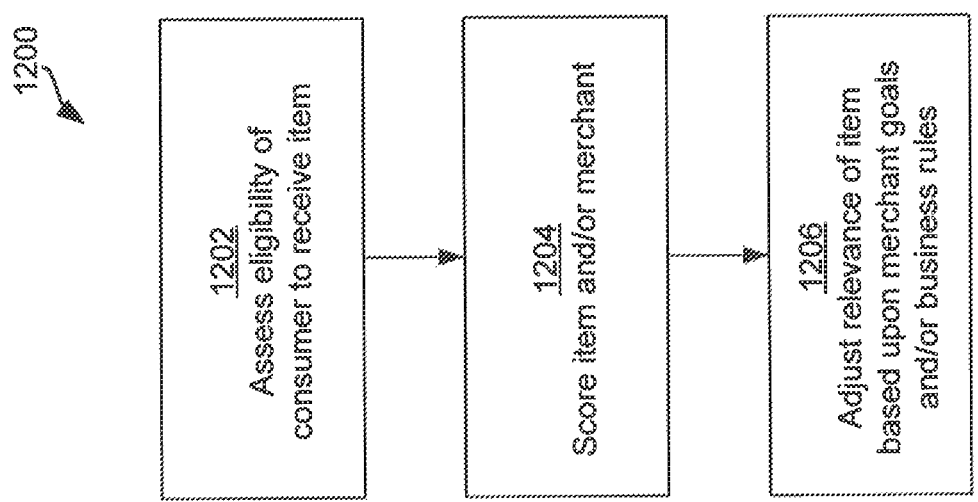
FIG. 12 shows a flowchart depicting an exemplary process for tailoring a relevant item to a consumer, in accordance with various embodiments.

In various embodiments and with reference to FIG. 12, a process 1200 for tailoring and/or recommending a relevant item, such as an offer and/or merchant, to a consumer is described. In addition to the processes described below, in various embodiments, a process for tailoring marketing to a consumer as described in U.S. patent application Ser. No. 13/245,636, filed, Sep. 26, 2011, and entitled Systems and Methods for Targeting Ad Impressions, which is incorporated herein by reference in its entirety, may be implemented. Similarly, in various embodiments, a process for tailoring marketing to a consumer as described in U.S. patent application Ser. No. 13/172,676, filed, Jun. 29, 2011, and entitled Spend Based Digital Ad Targeting and Measurement, which is incorporated herein by reference in its entirety, may be implemented. Further, in various embodiments, a process for tailoring marketing to a consumer as described in U.S. patent application Ser. No. 13/348,432, filed, Jan. 11, 2012, and entitled Systems and Methods for Digital Spend Based Targeting and Measurement, which is incorporated herein by reference in its entirety, may be implemented.

Further still, in various embodiments and in addition to the processes described below, a process for tailoring marketing to a consumer as described in U.S. patent application Ser. No. 11/315,262, filed, Dec. 23, 2005, and entitled Method and Apparatus for Collaborative Filtering of Account holder Transactions, which is incorporated herein by reference in its entirety, may be implemented. In addition, in various embodiments a process for tailoring marketing to a consumer as described in U.S. patent application Ser. No. 11/500,492, filed, Aug. 8, 2006, and entitled System and Method for Predicting Account holder Spending Using Collaborative Filtering, which is incorporated herein by reference in its entirety, may be implemented.

Further still, in various embodiments and in addition to the processes described below, a process for tailoring marketing to a consumer as described in U.S. Provisional Patent Application Ser. No. 61/610,461, filed, Mar. 13, 2012, and entitled Generating Merchant Recommendations for Consumers, which is incorporated herein by reference in its entirety, may be implemented. In addition, in various embodiments a process for tailoring marketing to a consumer as described in U.S. Provisional Patent Application Ser. No. 61/610,981, filed, Mar. 14, 2012, and entitled Generating a Consumer Review Using Customized Tags, which is incorporated herein by reference in its entirety, may be implemented. Moreover, in various embodiments a process for tailoring marketing to a consumer as described in U.S. Provisional Patent Application Ser. No. 61/610,983, filed, Mar. 14, 2012, and entitled Transaction Rewards List, which is incorporated herein by reference in its entirety, may be implemented.

Referring broadly to FIG. 12, each of the steps 1202-1206 may be performed alone and/or in combination with any other step 1202-1206. Accordingly, as shown, in various embodiments, a consumer's eligibility may be assessed (step 1202). As described herein, an item eligibility system 104 may assess a consumer's eligibility to receive an item, such as an offer and/or information (e.g., a recommendation) associated with a merchant. Furthermore, a consumer may be ineligible to receive an item for many reasons, but to give one example, a consumer may be ineligible to receive an item, because the consumer holds a branded or partner transaction account (e.g., an AMERICAN EXPRESS DELTA SKYMILES account) that is associated with a partner and/or merchant (e.g., DELTA AIRLINES) that is unaffiliated with (and/or a competitor of) an item associated with another merchant (e.g., SOUTHWEST AIRLINES).

Further, in various embodiments, a consumer relevance value or score may be determined, as described herein (e.g., by a scoring system 1106) (step 1204). For instance, in various embodiments, a consumer relevance value (or "CRV") may be determined based on content and/or an industry associated with one or more items. Similarly, in various embodiments, a consumer relevance value may be determined based on a collaborative filtering algorithm, as described herein. Further, in various embodiments, a consumer relevance value may be based on either or both of content and/or a collaborative filtering algorithm.

Further still, in various embodiments, a consumer relevance value associated with an item such as an offer and/or merchant may be adjusted and/or determined based on one or more merchant goals and/or one or more business rules (e.g., by a real time system 1108) (step 1206). For example, as described herein, a consumer relevance value may be adjusted based on a merchant goal to acquire only new consumers, tailor existing consumers of the merchant, and/or tailor all consumers. Equally, in various embodiments, a consumer relevance value may be adjusted based on a holiday, a particular time of day, a determination that the consumer is traveling, a determination that the item is associated with a merchant who is some distance away and/or near to from the consumer's location, because the consumer has indicated a preference not to receive the item (e.g., the consumer has given the offer a "thumbs down"), and the like.

The phrases consumer, customer, user, account holder, account affiliate, cardmember or the like may be used interchangeably and shall include any person, group, entity, business, organization, business, software, hardware, machine and/or combination of these, and may, in various embodiments, be associated with a transaction account, buy merchant offerings offered by one or more merchants using the account and/or be legally designated for performing transactions on the account, regardless of whether a physical card is associated with the account. For example, a consumer or account affiliate may include a transaction account owner, a transaction account user, an account affiliate, a child account user, a subsidiary account user, a beneficiary of an account, a custodian of an account, and/or any other person or entity affiliated or associated with a transaction account.

In various embodiments, a consumer may receive a tailored offer, as described below. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to "business," "merchant," "service establishment," or "SE" may be used interchangeably with each other and shall mean any person, entity, distributor system, software and/or hardware that is a provider, broker and/or any other entity in the distribution chain of goods or services. For example, a merchant may be a grocery store, a retail store, a restaurant, a travel agency, a service provider, an on-line merchant and/or the like. In various embodiments, a merchant may request payment for goods sold to a consumer or consumer who holds an account with a transaction account issuer.

As used herein, terms such as "transmit," "communicate" and/or "deliver" may include sending electronic data from one system component to another over a network connection. Additionally, as used herein, "data" may include information such as commands, queries, files, data for storage, and the like in digital or any other form.

Phrases and terms similar to "item" may include any good, service, offer, merchant, type of merchant, demographic data, consumer profile data, consumer profile, type of transaction account, transaction account, period of time (e.g., a period of time a consumer has been a consumer of a transaction account issuer), size of wallet, share of wallet, information, and the like. Further, in various embodiments, an item may comprise an output or result of a collaborative filtering algorithm, an algorithm for matching a consumer with a particular interest or set of interests (e.g., baseball or yoga, to provide a few examples), and the like. In various embodiments, such an algorithm may be referred to as an "interest graph" or an "interest graphing algorithm."

As used herein, an "offer" may comprise any data and/or information. As described herein, an offer may comprise one or more items. In addition, an offer may comprise data associated with one or more items, also as discussed herein. An offer may further comprise one or more characteristics or metadata. The characteristics or metadata associated with an offer may describe one or more attributes associated with the offer. Further, in various embodiments, an offer may comprise an offer to purchase good or service offered for sale by a merchant or SE. Similarly, in various embodiments, an offer may be associated with a merchant or SE.

As used herein, "record of charge" or "ROC" may comprise a record of a transaction or charge by a consumer with a particular merchant. In various embodiments, a ROC may comprise a cumulative value, which may indicate a number of total transactions or purchases a consumer has made from a particular merchant. Further, in various embodiments, a ROC may simply comprise an indication that a consumer has made at least one purchase from a merchant (e.g., within a particular time period). For instance, where a consumer's transaction history shows that the consumer has made at least one purchase from a merchant (e.g., within 12 months), a ROC may simply comprise a binary value, such as a "1" or a "yes." Conversely, where a consumer's transaction history indicates that a consumer has not made a purchase from a merchant, a ROC may simply comprise a value such as a "0" or a "no".

A "channel" may include any system or method for delivering content, and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe pdf document, etc.), an "ebook," an "emagazine," an application or micro-application (as described below), a text message, an email, and the like. In various embodiments, a channel may be hosted or provided by a data partner. Further, in various embodiments, a channel may comprise a social media channel, such as FACEBOOK, FOURSQUARE, TWITTER, and the like.

A "consumer profile" or "consumer profile data" may comprise any information or data about a consumer that describes an attribute associated with the consumer (e.g., a preference, an interest, demographic information, personally identifying information, and the like).

In various embodiments, a consumer profile may be based upon a variety of data. For example, a consumer profile may be based upon data that is received, culled, collected, and/or derived from a variety of sources, such as a consumer's transaction history, data associated with or available via a consumer's social networking profile (e.g., a consumer's FACEBOOK profile), data associated with a consumer's physical location, and/or other publicly and/or privately available sources of information about a consumer. In various embodiments, a consumer profile may not be based upon such data, unless a consumer opts in or requests that such data be used.

Further, in various embodiments, a consumer profile may be based upon data contributed by a consumer, a merchant, a third party, and/or an SE (as described below). Such data may comprise, for example, a consumer's personal information, e.g., demographic information, a consumer's date of birth, a consumer's residence information, an address of the consumer's work, a specific preference associated with the consumer (e.g., a preference for a certain type of vacation, such as a preference for a tropical vacation), a website in which the consumer is interested, and the like. Further, a consumer may contribute data towards a consumer profile by way of a form and/or questionnaire, such as, for example, a web-based form or questionnaire.

With further regard to the types of data which may be contributed to a consumer profile, in general, any information that a consumer would like to serve as a basis for a consumer profile may be contributed. For instance, a consumer profile may comprise location data (e.g., data associated with a global positioning system, a home address, a work address, family location data, data about a consumer's most shopped or favorite shopping locations, data about a consumer's most visited or favorite places), data associated with a consumer's favorite websites, digital destinations, or magazines (e.g., blogs, news websites, shopping websites, research websites, financial websites, etc.), personal data (e.g., email addresses, physical addresses, phone numbers, age information, income information, expenses information, etc.), data associated with a consumer's status or mode of travel (e.g., vacation data, business data, personal data, airline data, lodging data, etc.), data associated with a consumer's favorite items (e.g., food, restaurants, groceries, electronics, music, gaming, clothing types, hobbies, fitness, etc.), and the like.

In addition, in various embodiments, a consumer profile may include online tracking cookie data, web beacon data, web tracking data, web packet trace data, digital fingerprint data, clickstream data, purchase or transaction history data, data entered by a consumer in a web based form, data purchased by a merchant about a consumer, social networking data, banking and/or credit card data, stock keeping unit ("SKU") data, transactional and/or budget data, coupon data, retail data (e.g., items purchased, wish lists, etc.), data from third party personal data aggregators, search engine data, and/or any other data which the merchant may have in its possession or to which the merchant may gain access.

In various embodiments, a consumer may specify that a consumer profile may be based upon certain data, but that the profile should not be based upon other data. For example, a consumer may specify that the consumer's profile may be based upon data associated with the consumer's transaction history, but may not be based upon data culled from the consumer's social networking profile.

Phrases and terms similar to "account," "transaction account," "account," "account number," "account code," and/or "consumer account" may include any account that may be used to facilitate a financial transaction. These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, POP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

With further regard to terms such as "consumer," "customer," "merchant," and the like, each of these participants may be equipped with a computing device in order to interact with the system and facilitate online commerce transactions. A consumer or consumer may have a computing unit in the form of a personal computer, although other types of computing units may be used including laptops, notebooks, hand held computers, set-top boxes, cellular telephones, touch-tone telephones and the like. A merchant may have a computing unit implemented in the form of a computer-server, although other implementations are contemplated by the system. A bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein A merchant computer and/or a bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

An electronic commerce system may be implemented at the consumer and issuing bank. In an exemplary implementation, the electronic commerce system may be implemented as computer software modules loaded onto the consumer computer and the banking computing center. The merchant computer may not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more," Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof are intended to cover a non-exclusive inclusion, such that a process, method, article, or apparatus that comprises a list of elements does not include only those elements but may include other elements not expressly listed or inherent to such process, method, article, or apparatus.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" or "closed loop data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" or "processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the consumer and the merchant and also between merchant and payment processor.

What is claimed is:

1. A method, comprising:
   selecting, by a computer-based system configured for determining interest merchants, a seed merchant relevant to a topic interest to generate a seeded merchant list,
       wherein the seed merchant and the seeded merchant list are associated with a keyword corresponding to a topic interest;
   identifying, by the computer-based system, consumers that have completed a transaction with the at least one seed merchant to generate a list of identified consumers;
   determining, by the computer-based system, merchants that have initiated a transaction with a transaction account associated with the identified consumers that do not correspond to the merchants of the seeded merchant list,
       wherein the merchants are do not have an attribute that corresponds to the key word;
   scoring, by the computer-based system, the merchants based on at least one of network connectivity, activity, or merchant over index,
   wherein the scoring generates a list of scored merchants,
   wherein the scoring the merchants comprises individually calculating a preliminary merchant score and calculating a merchant interest network score (MINS) for each merchant,
   wherein the $$MINS = \frac{\sum_{i=1}^{I} 1: (Ci, Mj) \in \text{Tint} / \text{Size}(Cint)}{\sum_{i=1}^{I} 1: (Ci, Mj) \in Ta / \text{Size}(Ca)},$$

wherein the preliminary merchant score is based on a merchant network connectivity (MNC) and a merchant network activity (MNA), and
   wherein the MINS is based on a percentage of interest consumers with at least one transaction at the merchant relative to a percentage of all consumers with at least one transaction at the merchant;

updating, by the computer-based system, the seeded merchant list in response to a comparison of the list of scored merchants relative to a scoring threshold,
  wherein the updating the seeded merchant list comprises adding sufficiently scoring merchants and removing insufficiently scoring merchants from the seeded merchant list;
scoring, by the computer-based system, the list of identified consumers based on at least one of a number of distinct merchants in transaction or merchant over-indexing;
receiving, by the computer-based system and via a real time system, a request for a recommendation for a consumer via a mobile device of the consumer;
creating, by the computer-based system and via the real time system, a list of recommended merchants based on the seed merchant list and in response to receiving the request;
determining, by the computer-based system, a location of the consumer based on the request from the mobile device, wherein the request includes global positioning system data from the mobile device;
adjusting, by the computer-based system and via the real time system, the seed merchant list in real time based on the location; and
presenting, by the computer-based system, via the real time system and to the mobile device, the seed merchant list in response to adjusting the seed merchant list based on the location.

2. The method of claim 1, further comprising performing, by the computer based system, an additional analysis cycle in response to a turnover index being greater than a turnover index threshold.

3. The method of claim 2, further comprising producing, by the computer based system, a list of updated interest merchants and a list of updated identified consumers, wherein the updated interest merchants and the updated identified consumers are relevant to the topic interest.

4. The method of claim 3, further comprising determining, by the computer-based system, a group of boost consumers, wherein the determining the group of boost consumers comprises:
  evaluating consumer transactions across a subset of merchants associated with the interest, wherein the subset of merchants have a score above of threshold established for the interest; and
  retrieving consumers that have transactions with two or more distinct merchants from the list of updated interest merchants.

5. The method of claim 4, wherein the determining merchants visited by the identified consumers includes merchants visited by the group of boost consumers.

6. The method of claim 1,
wherein the network connectivity $$(NC)j = \frac{\sum_{i=1}^{I}(CDMi-1):(Ci, Mj) \in \text{Tint}}{\sum_{i=1}^{I} 1:(Ci, Mj) \in \text{Tint}},$$

where $CDMi = \sum_{j=1}^{J} 1(Ci, Mj) \in \text{Tint}$,
  wherein NC is network connectivity, and
  wherein CDM is customer distinct merchant.

7. The method of claim 1,
wherein the $MNAj = (\sum_{i=1}^{I} CROCSi:(Ci, Mj) \in \text{Tint}) - MCROCSj$,
wherein $CROCSi = \sum_{t \in Tint} 1:(Ct, Mj) \in \text{Tint}$, and wherein $MROCSj = \sum_{t \in Tint} 1:(Ci, Mt) \in \text{Tint}$,
wherein MNA is merchant network activity,
wherein CROCS is consumer records of charge, and
wherein MROCS is merchant records of charge.

8. The method of claim 4, wherein the interest merchants include:
  a list of initial merchants retrieved from a merchant database, wherein the list of initial merchants may further result from at least one of industry codes, or explicit queries;
  small merchants that were removed from the list of initial merchants and reinstated in response to the small merchants having sufficient consumer activity; and
  consumer booster merchants associated with the group of boost consumers, wherein the consumer booster merchants are sufficiently connected to specific, topic-related consumers to be deemed an interest merchant.

9. The method of claim 1, wherein the seed merchant comprises at least one of: an industry code, one or more specific merchants, or keywords.

10. The method of claim 1, further comprising determining a consumer score measuring consumer spend activity and an average merchant interest network score (MINS) per consumer, wherein the consumer spend activity is based on the number of distinct interest merchants where the consumer has conducted a transaction.

11. The method of claim 10,
wherein the consumer spend activity $(CDMi) = \sum_{i=1}^{I} 1:(Ci, Mj) \in \text{Tint}$, and
wherein the average merchant interest network score (MINS) per consumer is $$(Avg\ MINScusti) = \frac{\sum_{i=1}^{I} dist(MINSse \in CUSTiROCs)}{\sum distSECusti}.$$

12. The method of claim 4, wherein the analysis cycle is repeated in response to not satisfying a predetermined limitation, wherein the predetermined limitation is at least one of:
  a set number of iterations of the analysis to be completed; or
  a turnover index exceeding a specific threshold, wherein the turnover index is based on a number of merchants added during the analysis cycle plus a number of merchants dropped during the analysis cycle, divided by the number of the merchants in the analysis cycle.

13. The method of claim 1, further comprising:
  determining, by the computer based system, a plurality of personas for a first plurality merchants based on an interest merchant, where the plurality of personas are based on at least one of predetermined activities or transaction information from first transaction accounts, wherein the first transaction accounts are associated with at least one of the plurality of personas;
  receiving, by the computer based system, a selected persona from the plurality of personas;
  determining, by the computer based system, a subset of total merchants associated with the selected persona; and
  recommending, by the computer based system, at least a portion of the subset of total merchants based on the selected persona.

14. An article of manufacture including a non-transitory, tangible computer readable storage medium having instructions stored thereon that, in response to execution by a computer-based system for processing an analysis cycle to determine interest merchants, cause the computer-based system to perform operations comprising:

selecting, by the computer-based system, a seed merchant relevant to a topic interest to generate a seeded merchant list,
wherein the seed merchant and the seeded merchant list are associated with a keyword corresponding to a topic interest;

identifying, by the computer-based system, consumers that have completed a transaction with the at least one seed merchant to generate a list of identified consumers;

determining, by the computer-based system, merchants that have initiated a transaction with a transaction account associated with the identified consumers that do not correspond to the merchants of the seeded merchant list,
wherein the merchants are do not have an attribute that corresponds to the key word;

scoring, by the computer-based system, the merchants based on at least one of network connectivity, activity, or merchant over index,
wherein the scoring generates a list of scored merchants,
wherein the scoring the merchants comprises individually calculating a preliminary merchant score and calculating a merchant interest network score (MINS) for each merchant,
wherein the $$MINS = \frac{\sum_{i=1}^{I} \frac{1:(Ci, Mj) \in \text{Tint}}{Size(Cint)}}{\sum_{i=1}^{I} \frac{1:(Ci, Mj) \in Ta}{Size(Ca)}},$$

wherein the preliminary merchant score is based on a merchant network connectivity (MNC) and a merchant network activity (MNA), and
wherein the MINS is based on a percentage of interest consumers with at least one transaction at the merchant relative to a percentage of all consumers with at least one transaction at the merchant;

updating, by the computer-based system, the seeded merchant list in response to a comparison of the list of scored merchants relative to a scoring threshold,
wherein the updating the seeded merchant list comprises adding sufficiently scoring merchants and removing insufficiently scoring merchants from the seeded merchant list;

scoring, by the computer-based system, the list of identified consumers based on at least one of a number of distinct merchants in transaction or merchant over-indexing;

receiving, by the computer-based system and via a real time system, a request for a recommendation for a consumer via a mobile device of the consumer;

creating, by the computer-based system and via the real time system, a list of recommended merchants based on the seed merchant list and in response to receiving the request;

determining, by the computer-based system, a location of the consumer based on the request from the mobile device, wherein the request includes global positioning system data from the mobile device;

adjusting, by the computer-based system and via the real time system, the seed merchant list in real time based on the location; and presenting by the computer-based system, via the real time system and to the mobile device, the seed merchant list in response to adjusting the seed merchant list based on the location.

15. The article of claim 14, further comprising determining, by the computer-based system, a group of boost consumers, wherein the determining the group of boost consumers comprises:

evaluating consumer transactions across a consumer database; and retrieving consumers that have transactions with two or more distinct merchants from a list of updated interest merchants.

16. The article of claim 15, wherein the determining merchants visited by the identified consumers includes merchants visited by the group of boost consumers.

17. A system comprising:

a processor for processing an analysis cycle to determine interest merchants, a tangible, non-transitory memory configured to communicate with the processor, the tangible, non-transitory memory having instructions stored thereon that, in response to execution by the processor, cause the processor to perform operations comprising:

selecting, by the processor, a seed merchant relevant to a topic interest to generate a seeded merchant list,
wherein the seed merchant and the seeded merchant list are associated with a keyword corresponding to a topic interest;

identifying, by the processor, consumers that have completed a transaction with the at least one seed merchant to generate a list of identified consumers;

determining, by the processor, merchants that have initiated a transaction with a transaction account associated with the identified consumers that do not correspond to the merchants of the seeded merchant list,
wherein the merchants are do not have an attribute that corresponds to the key word;

scoring, by the processor, the merchants based on at least one of network connectivity, activity, or merchant over index,
wherein the scoring generates a list of scored merchants,
wherein the scoring the merchants comprises individually calculating a preliminary merchant score and calculating a merchant interest network score (MINS) for each merchant,
wherein the $$MINS = \frac{\sum_{i=1}^{I} \frac{1:(Ci, Mj) \in \text{Tint}}{Size(Cint)}}{\sum_{i=1}^{I} \frac{1:(Ci, Mj) \in Ta}{Size(Ca)}},$$

wherein the preliminary merchant score is based on a merchant network connectivity (MNC) and a merchant network activity (MNA), and wherein the MINS is based on a percentage of interest consumers with at least one transaction at the merchant relative to a percentage of all consumers with at least one transaction at the merchant;

updating, by the processor, the seeded merchant list in response to a comparison of the list of scored merchants relative to a scoring threshold, wherein the updating the seeded merchant list comprises adding sufficiently scoring merchants and removing insufficiently scoring merchants from the seeded merchant list;

scoring, by the processor, the list of identified consumers based on at least one of a number of distinct merchants in transaction and merchant over-indexing;

receiving, by the processor and via a real time system, a request for a recommendation for a consumer via a mobile device of the consumer;

creating, by the processor and via the real time system, a list of recommended merchants based on the seed merchant list and in response to receiving the request;

determining, by the processor, a location of the consumer based on the request from the mobile device, wherein the request includes global positioning system data from the mobile device;

adjusting, by the processor and via the real time system, the seed merchant list in real time based on the location; and presenting, by the processor, via the real time system and to the mobile device, the seed merchant list in response to adjusting the seed merchant list based on the location.

18. The system of claim 17, further comprising determining, by the computer-based system, a group of boost consumers, wherein the determining the group of boost consumers comprises:

evaluating consumer transactions across a consumer database; and retrieving consumers that have transactions with two or more distinct merchants from a list of updated interest merchants.

19. The system of claim 18, wherein the determining merchants visited by the identified consumers includes merchants visited by the group of boost consumers.

* * * * *